United States Patent [19]

Robson

[11] Patent Number: 4,867,318

[45] Date of Patent: Sep. 19, 1989

[54] STORAGE RACK AND THE LIKE

[75] Inventor: Jerry A. Robson, Mansfield, Ohio

[73] Assignee: Witty Inventions, Inc., Mansfield, Ohio

[21] Appl. No.: 195,951

[22] Filed: May 19, 1988

[51] Int. Cl.[4] .......................... A47F 5/13; A47B 65/00

[52] U.S. Cl. ...................................... 211/41; 211/184; 211/89

[58] Field of Search ....................... 211/42, 43, 88, 89, 211/184

[56] References Cited

U.S. PATENT DOCUMENTS

| | | | |
|---|---|---|---|
| 462,123 | 1/1891 | Friede | 211/88 X |
| 3,227,282 | 1/1966 | Punt | 211/41 X |
| 3,889,814 | 6/1975 | Rice | 211/41 X |
| 4,072,230 | 2/1978 | Mulligan | 211/41 X |
| 4,327,838 | 5/1982 | Cooke | 211/184 |
| 4,418,820 | 12/1983 | Nagle et al. | 211/41 X |
| 4,560,072 | 12/1985 | Burrell | 211/88 X |
| 4,697,776 | 10/1987 | Edson | 211/88 X |

FOREIGN PATENT DOCUMENTS 0095810 12/1983 European Pat. Off. ............. 211/42

Primary Examiner—Ramon S. Britts
Assistant Examiner—Karen J. Chotkowski
Attorney, Agent, or Firm—Lon H. Romanski

[57] ABSTRACT

A storage rack for the storage of items such as video and audio recordings is shown as having a mounting portion by which the storage rack can be mountably secured to an associated support structure; the mounting portion carries a relatively lower disposed support for providing a generally upward support for the items to be stored on the storage rack and such mounting portion carries a relatively upper disposed constraining support for maintaining the items, stored on the storage rack, between the upper support and the associated support structure.

27 Claims, 11 Drawing Sheets

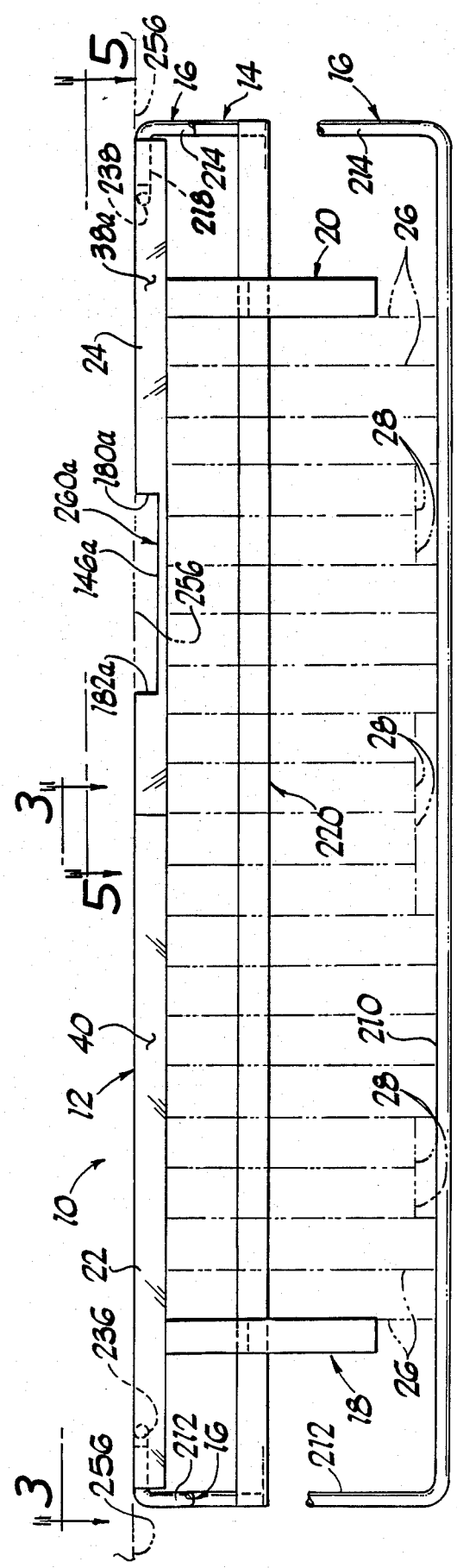
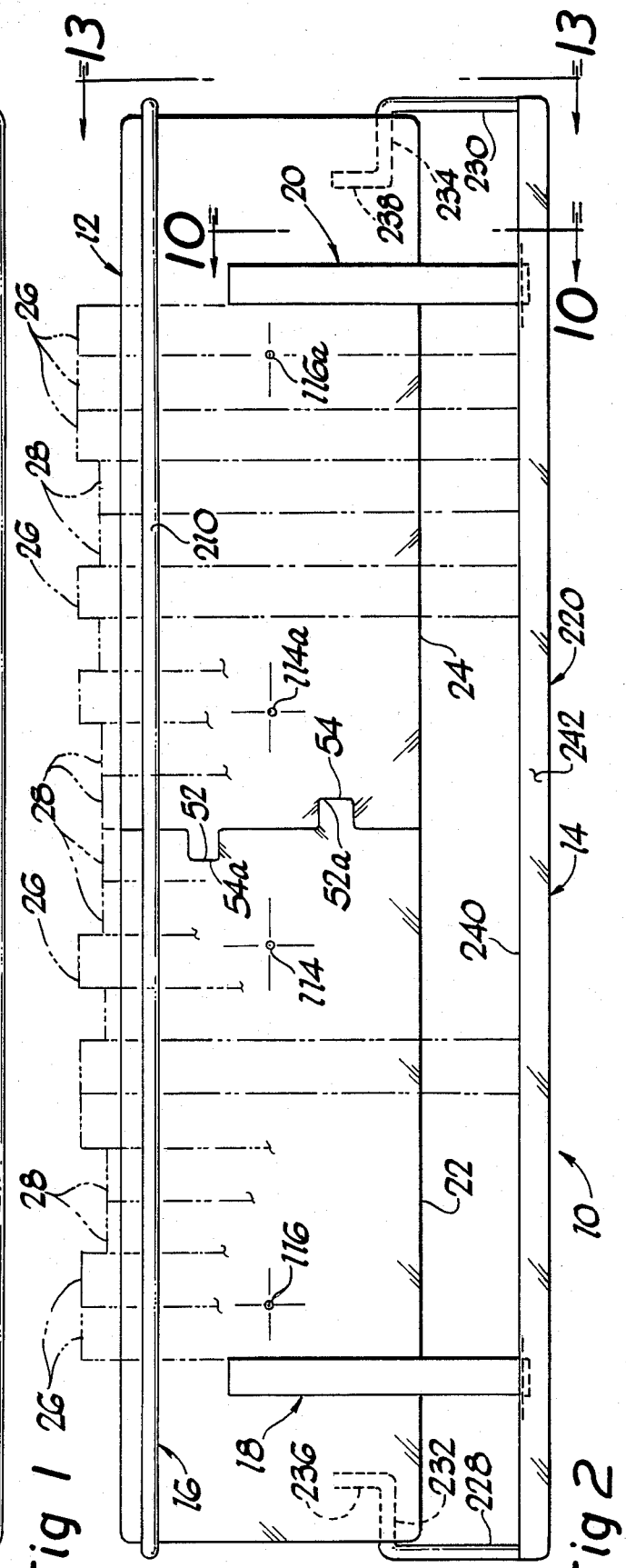
Fig 1
Fig 2

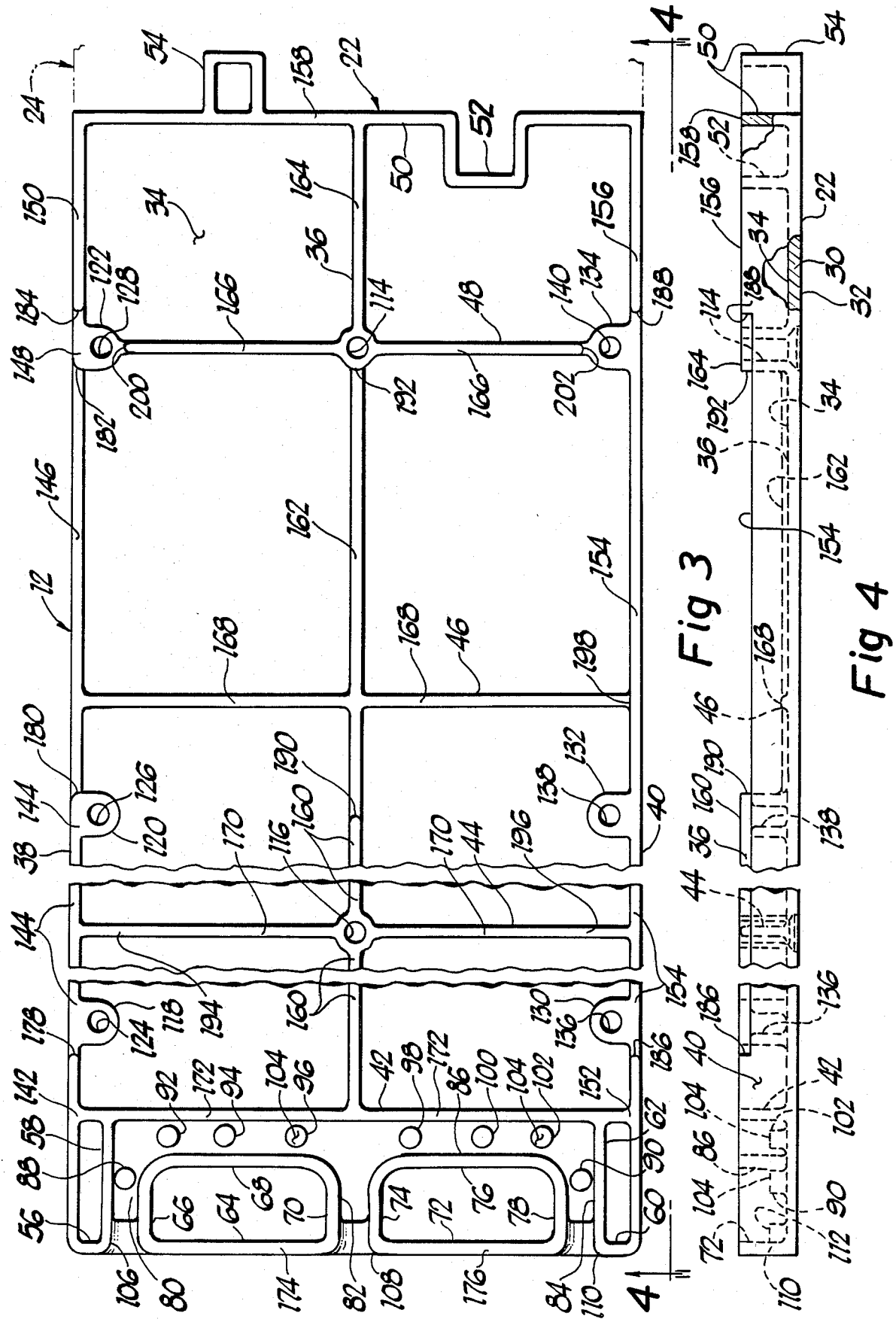

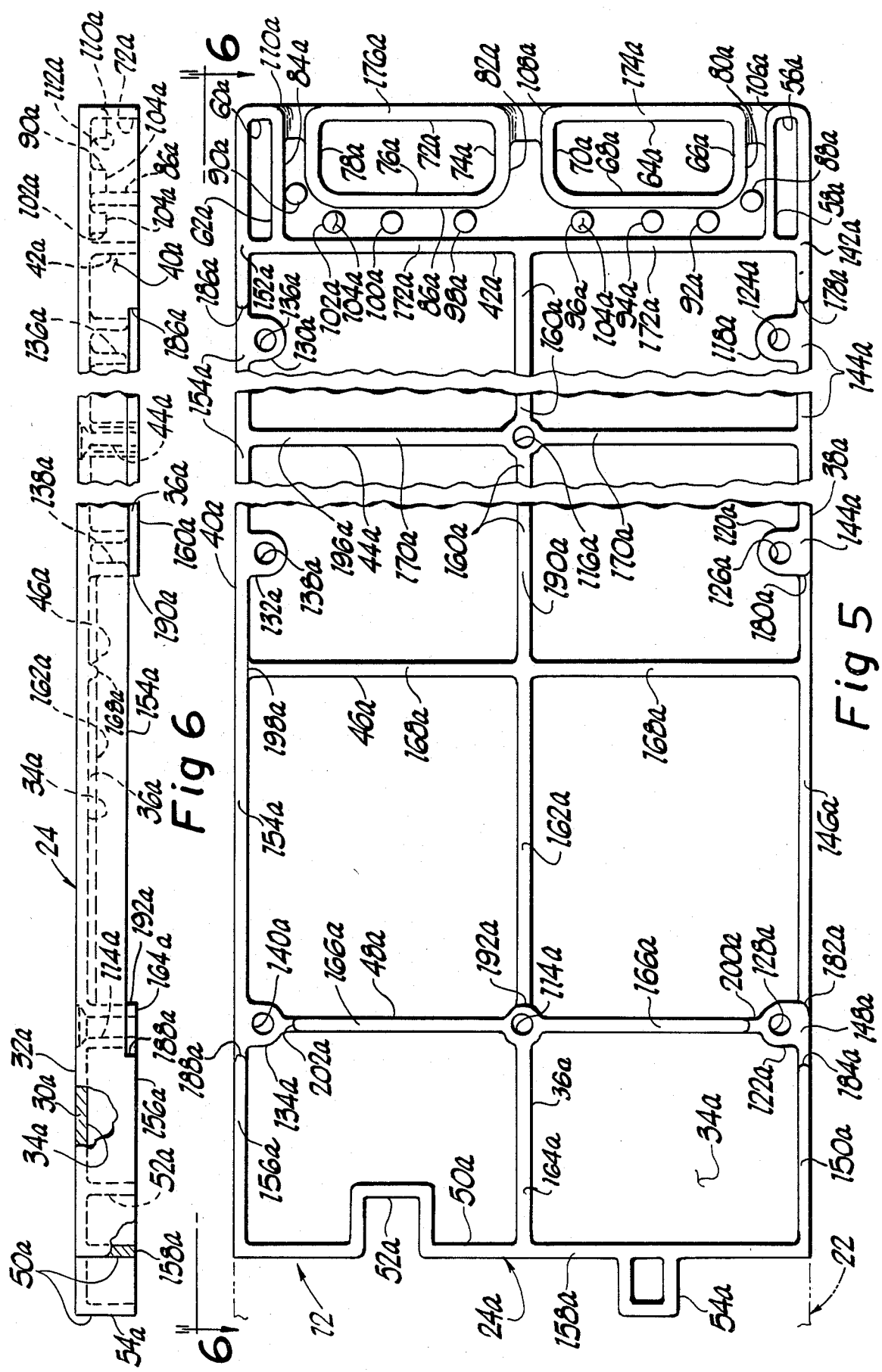

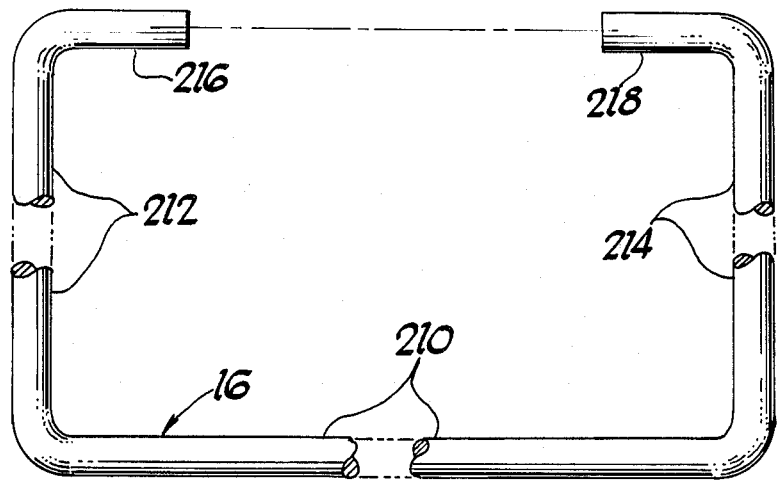
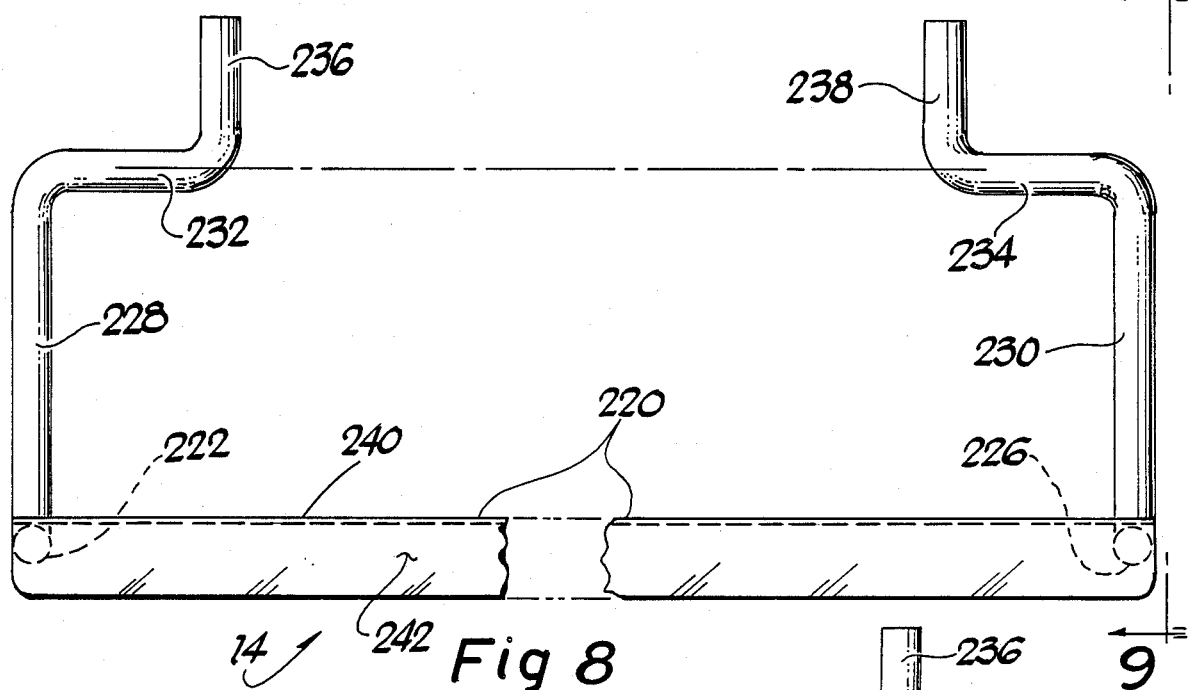
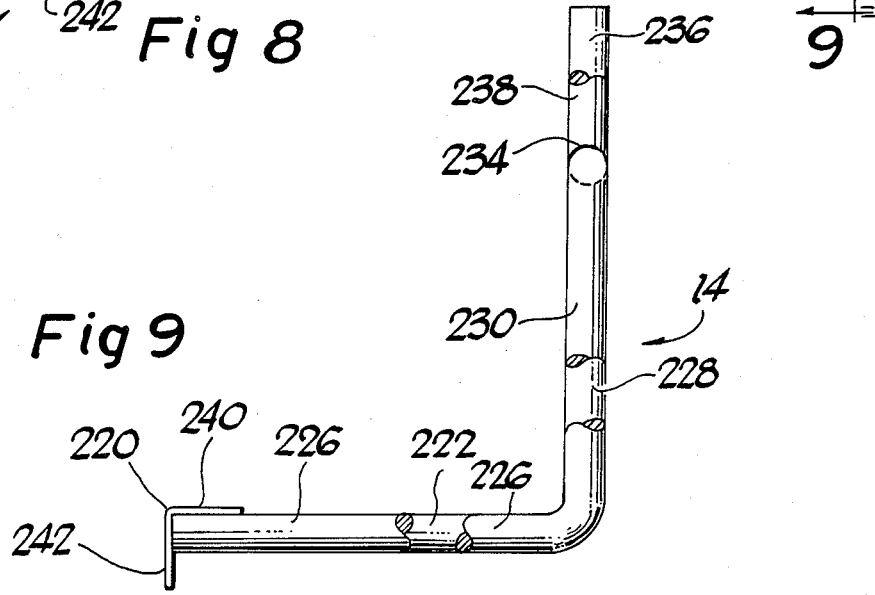

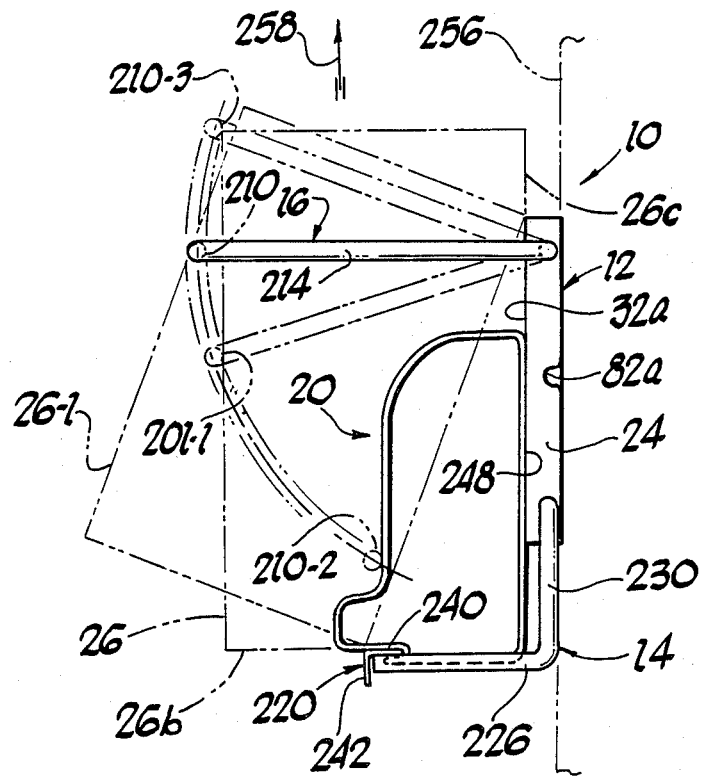
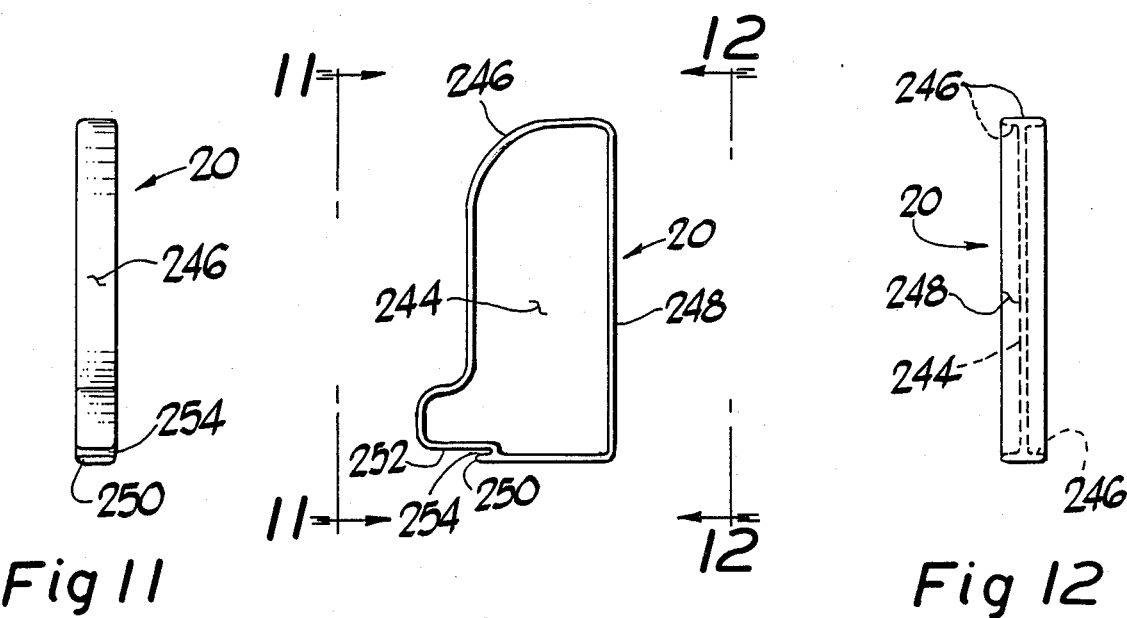

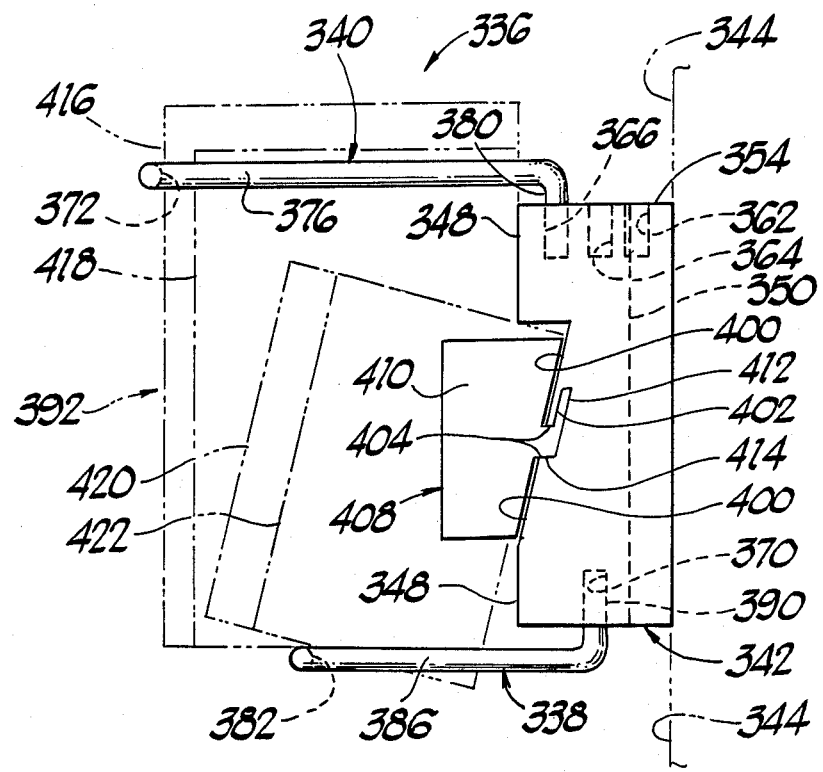
Fig 23
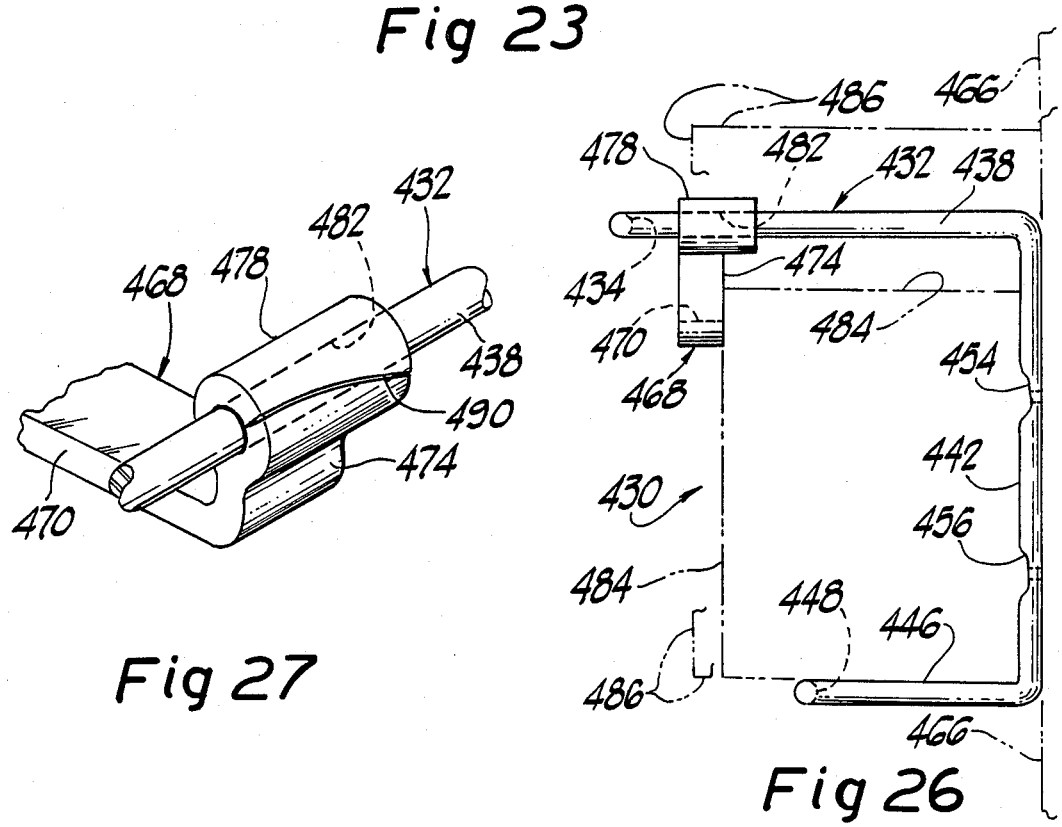
Fig 27
Fig 26

STORAGE RACK AND THE LIKE

FIELD OF THE INVENTION

This invention relates generally to storage apparatus and more particularly to such storage apparatus which is capable of storing articles of various dimensional sizes and yet permits ready access to any of such stored articles.

BACKGROUND OF THE INVENTION

The television industry, in all of its facets, has and continues to produce and vend both recorded and unrecorded television tapes. The recorded television tapes run the full spectrum of subject matter, as for example, educational and instructional material, copies of motion picture film ("movies") and sporting events. The unrecorded tapes are, for the most part, employed by the general public in recording such things as personally experienced events (which are sought to be preserved in time) and recording selected television broadcasts as for later viewing.

When such television tapes, both recorded and unrecorded, were first introduced into the marketplace, they were referred to as Video Cassette Recording Tapes and shortly thereafter, and at the present, such are referred to by the acronym, VCR, which has become a generic term for both recorded and unrecorded television tapes. (The acronym, VCR, will hereinafter be employed in its generic sense as applying to any and all cassettes of television recording tapes.)

The television industry has not settled on a unified size or format of VCR tape. For example, presently there are VCR tape formats commonly referred to as; VHS, BETA, 8 mm. and "C" or VHSC with each of such differing from the others not only in applied technology but also in physical size and configuration.

It is common for individuals and/or households (having VCR recording and/or play-back apparatus) to attain an expanding library of recorded VCR tapes by the continued accumulation of a plurality of recorded VCR tapes which are desired to be preserved in that recorded state. Further, it is not rare that such a library of recorded VCR tapes may be comprised of two or more differing formats as, for example, any of the formats hereinbefore identified. Also, many of such individuals or households have a continuing expanding library of audio recordings which may be in the form of tapes and/or disks. Again, the physical dimensions of such audio recordings differ from the various video formats hereinbefore identified.

The greater in number of recorded VCR tapes and/or audio recordings comprising such a library, the greater, of course, becomes the problem of physically storing them especially in a manner which permits the ready access to any selected one or more of the recordings as for play-back purposes. This problem is further compounded by the fact that if the library is comprised of two or more formats of recorded VCR tapes, and possibly audio recordings, the physical sizes and configurations of such recorded VCR tapes and audio recordings vary from each other. Also, in households having a number of members, some of which may be of relatively young age, it is highly desirable that the library of recordings be stored in a manner whereby, in the main, access to the library may be restricted as to prevent the generally unauthorized use of any of such recordings thereby preventing for example, as in the case of tape recordings, the accidental or undesired electronic removal of the material recorded on such tapes. Also, such restricted access to the library of recordings may well prevent physical damage thereto or loss thereof.

Further, in some households, for personal reasons (aesthetic or other) it is desired not to store the library of recorded VCR tapes as to be in clear view of, for example, guests of that household and yet ready access to the library of tapes is desired.

Heretofore, the prior art has failed to provide any storage system or structure which would fulfill the aforestated needs and desires.

The invention as herein disclosed and described is primarily directed to meeting the aforestated needs as well as to the solution of other related and/or attendant problems of storage of recordings whether such be audio or video.

SUMMARY OF THE INVENTION

According to the invention, a storage rack for the storage of recordings and the like, comprises mounting means, relatively lower disposed lower support means carried by said mounting means, relatively upper disposed upper support means carried by said mounting means, wherein said mounting means is adapted to be operatively secured to associated support structure, wherein said lower support means is effective to operatively engage a lower portion of each of such recordings as are placed generally thereatop to thereby provide for generally vertical support of each of such recordings, wherein when said recordings are placed atop said lower support means a first edge of said recordings is disposed at least relatively close to said support structure and a second edge of said recordings opposite to said first edge is disposed at a distance further away from said support structure, wherein said upper support means is situated at an elevation above the elevation of said lower support means, wherein said upper support means is effective to operatively engage only a second edge of said recordings as to thereby generally contain said stored recordings between said upper support means and said support structure, wherein said lower support means operatively engages said lower portions of said recordings placed thereatop at a first maximum distance away from said mounting means, wherein said upper support means operatively engages said second edge of said recordings placed atop said lower support means at a second distance away from said mounting means, and wherein said second distance is greater than said first maximum distance.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 1 is a top plan view of a storage rack employing teachings of the invention;

FIG. 2 is a front elevational view of the storage rack of FIG. 1;

FIG. 3 is a view taken generally on the plane of line 3—3 of FIG. 1, looking in the direction of the arrows, and illustrating, in enlarged scale, one of the elements of the storage rack of FIG. 1, with such element being shown with portions thereof broken away;

FIG. 4 is a view taken generally on the plane of line 4—4 of FIG. 3 and looking in the direction of the arrows;

FIG. 5 is a view taken generally on the plane of line 5—5 of FIG. 1, looking in the direction of the arrows, and illustrating, in enlarged scale, another of the elements of the storage rack of FIG. 1, with such element being shown with portions thereof broken away;

FIG. 6 is a view taken generally on the plane of line 6—6 of FIG. 5 and looking in the direction of the arrows;

FIG. 7 is an enlarged view of still another of the elements of the structure of FIGS. 1 and 2 with such being shown in relatively enlarged scale and with portions thereof being shown as broken away;

FIG. 8 is an enlarged view of yet another of the elements of the structure of FIGS. 1 and 2 with such being shown in relatively enlarged scale and with portions thereof being shown as broken away;

FIG. 9 is view taken generally on the plane of line 9—9 of FIG. 8 and looking in the direction of the arrows;

FIG. 10 is a view taken generally on the plane of line 10—10 of FIG. 2, looking in the direction of the arrows, and illustrating another of the elements depicted in the structure of FIGS. 1 and 2;

FIG. 11 is a view taken generally on the plane of line 11—11 of FIG. 10 and looking in the direction of the arrows;

FIG. 12 is a view taken generally on the plane of line 12—12 of FIG. 10 and looking in the direction of the arrows;

FIG. 13 is an end elevational view of the storage rack of FIGS. 1 and 2, taken generally on the plane of line 13—13 of FIG. 2 and looking in the direction of the arrows;

FIG. 23 is a view taken generally on the plane of line 23—23 of FIG. 22 and looking in the direction of the arrows;

FIG. 26 is a view taken generally on the plane of line 26—26 of FIG. 25 and looking in the direction of the arrows; and FIG. 27 is an enlarged, somewhat perspective view, of a fragmentary portion of the structure shown in FIGS. 24, 25 and 26.

DETAILED DESCRIPTION OF THE PREFERRED EMBODIMENT

Figure 14:
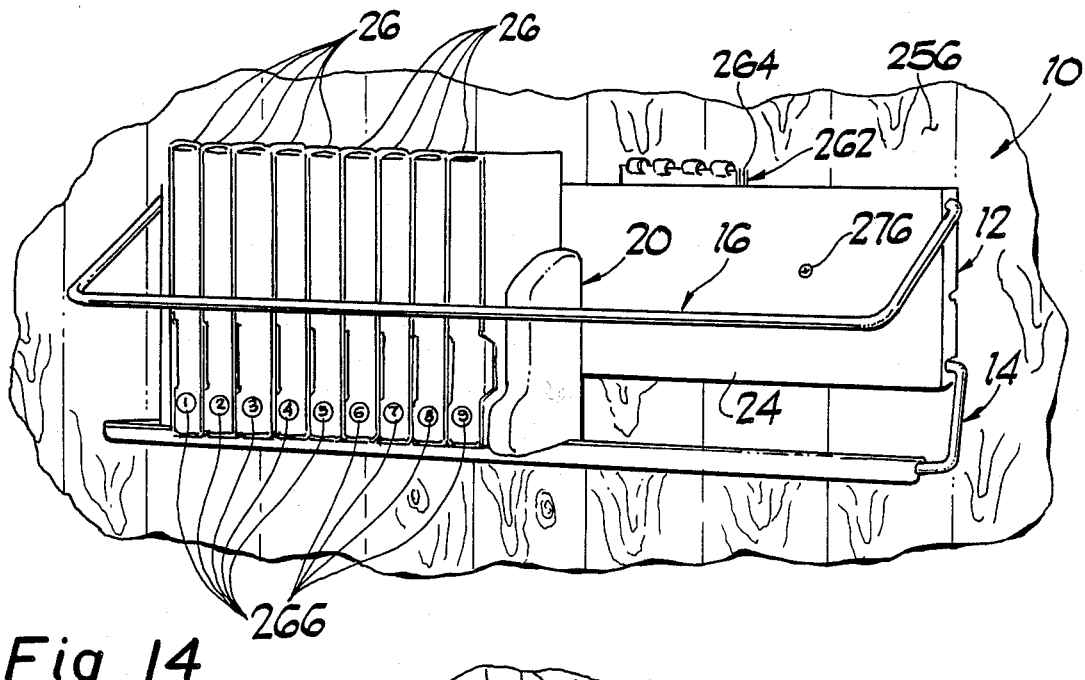
FIG. 14 is a somewhat perspective view of the storage rack of FIGS. 1, 2 and 13 mounted on associated support structure as, for example, a wall of a room.

Referring now in greater detail to the drawings, FIGS. 1 and 2 illustrate the storage rack 10 as comprising a back plate or body means 12 which, in turn, carries a lower disposed bottom support means 14, relatively upwardly situated retainer means 16 and, preferably, end plate or containment means 18 and 20. In the preferred embodiment, the body or mounting means 12 is comprised of two body or mounting portions or sections 22 and 24 which are formed to be identical to each other as will be described. Depicted in phantom line in both FIGS. 1 and 2 are a plurality of recordings such as, for example, VHS tapes as at 26—26 and Beta tapes as at 28—28.

Referring in greater detail to FIGS. 3 and 4, the body portion 22 of the mounting means 12 is illustrated as being preferably formed of molded plastic material such as, for example, ABS or high impact polystyrene. ABS is a term or acronym for any of a group of thermoplastics deriving such acronym, ABS, from the monomers which produce them; ie, Acrylonitrile-Butadiene-Styrene while polystyrene is a thermoplastic synthetic resin of variable molecular weight depending on the degree of polymerization, derived by the polymerization of styrene by free radicals with peroxide initiator.

In the preferred embodiment, such body portion 22 is formed as to have a planar wall portion 30, facing forwardly when the mounting means 12 is secured to associated support means, with such wall portion 30 having a forwardly disposed planar surface 32 and an opposite rearwardly or inwardly disposed surface 34. The wall 30 is preferably integrally formed with a generally medially situated longitudinally extending rib or flange-like portion 36 as well as oppositely situated side walls 38 and 40. A plurality of transversely extending rib-like means 42, 44, 46, 48 and 50 are provided as to be integrally formed with the front or face wall 30, the medial wall 36 and side walls 38 and 40.

With particular reference to the right end of body portion 22, as viewed in FIG. 3, it can be seen that end wall 50 is formed as to provide an indented-like or recess-like portion 52 and is also formed as to provide an extending tongue-like or key-like portion 54. The physical sizes and configurations of the recess-like opening 52 and the tongue or extension 54 are such that if the extension 54 were to be inserted into the opening 52, the extension 54 would be totally and closely (even tightly) received within the opening or recess 52. As best seen in FIG. 4, the front or face wall 30 fully continues into and forms a part of the extension 54.

Referring to the left end of body portion 22, as viewed in FIGS. 1 and 2, it can be seen that side wall 38 extends to an integral end portion 56 and then, in somewhat a loop fashion, doubles back, as by a wall portion 58, to again be integrally joined with transverse wall 42. Similarly, side wall 40 extends to an integral end portion 60 and then, in somewhat a loop fashion, doubles back, as by a wall portion 62, to again be integrally joined with transverse wall 42.

Such left end of body portion 22 is also provided with an additional series of wall means. More particularly a first continuous looped wall is comprised of wall portions 64, 66, 68 and 70 all of which are integrally formed with the front or face wall 30 and a second continuous looped wall is comprised of wall portions 72, 74, 76 and 78 all of which are also integrally formed with the frontal or face wall 30. As best seen in FIG. 3: wall portions 66 and 58 are spaced from each other thereby defining a channel-like passageway 80 therebetween; wall portions 70 and 74 are spaced from each other thereby defining a channel-like passageway 82 therebetween; wall portions 78 and 62 are spaced from each other thereby defining a channel-like passageway 84 therebetween; and, transverse wall 42 is spaced from both wall portions 68 and 76 thereby defining a generally transversely extending channel-like passageway 86 therebetween. As is shown in FIG. 3, each of channels or passages 80, 82 and 84 is in communication with channel or passage 86.

A plurality of support pads, bosses or the like are formed as to be generally within such channels or passages 80, 84 and 86. Such pads are preferably integrally formed with frontal wall 30 as to be extending, to a preselected distance, away from inner surface 34 of wall 30. More particularly a first support pad or boss 88 is situated generally in channel or passage 80 as to be generally between wall portions 58 and 66 while a second support pad 90 is situated generally in channel or passage 84 as to be generally between wall portions 78 and 62. A first series of support pads or bosses 92, 94 and 96 are situated generally in channel or passage 86 as between wall portion 68 and transverse wall 42 while a second series of support pads 98, 100 and 102 are situated generally in channel or passage 86 as between wall portion 76 and transverse wall 42. Each of such support pads is formed to have a projecting end surface 104, and, preferably all of such end surfaces 104—104 lie in a common plane as typically illustrated in FIG. 4. The entry to each of channels or passages 80, 82 and 84 is preferably of a flared configuration, as at 106, 108 and 110, respectively, with each of such terminating at a height, as typically at 112 of FIG. 4, which is coplanar with end support surfaces 104—104 of the support pads.

As best seen in FIG. 3, generally at the intersection of medial wall 36 and transverse wall 48 a first through hole or clearance passage 114 is formed as to extend through the front surface 32 of frontal wall 30 and such passage 114 is preferably formed with a countersunk configuration as in the face of frontal wall 30 whereby a mounting screw or the like (not shown) may be inserted therethrough with the head of such screw being recessed within the complementary countersink. Similarly, and for the same purpose, a clearance passageway 116 is formed, as at the intersection of medial wall 36 and transverse wall 44, as to extend through the front surface 32 of frontal wall 30.

Further, in the preferred embodiment of the body section 22, a plurality of boss-like enlargements 118, 120 and 122 are formed, integrally with frontal wall 30 and side wall 38, as to be spaced generally along side wall 38. Such enlargements are, in turn, formed with blind holes or passages 124, 126 and 128, respectively, as not to extend through the frontal wall 30. Similarly, a plurality of boss-like enlargements 130, 132 and 134 are formed, integrally with frontal wall 30 and side wall 40, as to be spaced generally along side wall 40. Such enlargements are also, in turn, formed with blind holes or passages 136, 138 and 140, respectively, as not to extend through the frontal wall 30.

As will hereinafter be described in detail, the projecting end surfaces of the various walls and/or ribs integrally formed with frontal wall 30 are at differing elevations, employing, for example, the face surface 32 of frontal wall 30 as a plane of reference. Such various projecting end surfaces (as well as portions thereof) will be referred to by separate reference numbers for ease and clarity of description.

Side wall 38 will be considered as having projecting end surface portions 142, 144, 146, 148 and 150; side wall 40 will be considered as having projecting end surface portions 152, 154 and 156; end wall 50 will be considered as having a projecting end surface 158 which extends for the full length thereof including the recess 52 and extension or tongue 54; medial rib or web 36 will be considered as having projecting end surface portions 160, 162 and 164; transverse wall 48 will be considered as having a projecting end surface portion 166 which also generally circumscribes clearance passageway 114; transverse wall 46 will be considered as having a projecting end surface portion 168; transverse wall 44 will be considered as having a projecting end surface portion 170 which also generally circumscribes clearance passageway 116; transverse wall 42 will be considered as having a projecting end surface portion 172; the generally looped wall, comprised of wall portions 64, 66, 68 and 70, will be considered as having a projecting end surface portion 174; and the generally looped wall, comprised of wall portions 72, 74, 76 and 78, will be considered as having a projecting end surface portion 176.

Further, as also to be more specifically described, there are a plurality of step or transitional surfaces which effectively form a juncture as between adjoining or adjacent pairs of such projecting end surfaces as hereinbefore described. With reference to both FIGS. 3 and 4 and referring first, generally, to wall 38, some of such transitional surfaces are depicted at 178, 180, 182 and 184; generally, along wall 40, other of such transitional surfaces are depicted at 186 and 188; generally, along medial rib 36, still other of such transitional surfaces are depicted at 190 and 192; generally, along transverse wall 44, additional ones of such transitional surfaces are depicted at 194 and 196; generally, along transverse rib 46, a transitional surface may be considered as existing at 198, that being where rib 46 effectively joins wall 40; and generally, along transverse wall 48 further transitional surfaces are depicted at 200 and 202.

Still with reference to FIGS. 3 and 4, the various projecting end surfaces extend away from the frontal wall 30 as to be generally in differing planes which, in turn, are spaced from wall 30 at distances differing from each other. The terms "highest", "intermediate" and "lowest" or "closest" as hereinafter used with regard to such differing planes are intended to respectively refer to: (a) the plane which is generally parallel to and spaced furthermost from face surface 32 of wall 30; (b) the plane which is generally parallel to and next furthermost spaced from face surface 32 of wall 30; and (c) the plane which is generally parallel to and spaced the closest to face surface 32 of wall 30.

With the foregoing in mind and starting at the left end (as viewed in FIG. 3) of the body section 22, the projecting end surface 142 of wall 38 (starting at transitional surface 178) along with the projecting end surface of wall portions 56 and 58, the projecting end surface 152 of wall 40 (starting at transitional surface 186) along with the projecting end surface of wall portions 60 and 62, the projecting end surfaces 174 and 176, the projecting end surface 160 of medial rib 36 and extending to transitional surface 190, and the projecting end surface 170 of transverse wall 44 and extending between transitional surfaces 194 and 196 are preferably generally contained in the plane which is "highest" as hereinbefore described.

Referring now to the right end (as viewed in FIG. 3) of the body section 22, the projecting end surface 158 of wall 50, the effectively continuing projecting end surface 150 generally along wall 38 and terminating as at transitional surface 184, the effectively continuing projecting end surface 156 generally along wall 40 and terminating as at transitional surface 188, projecting end surface 164 of medial wall or rib 36 effectively extending from projecting end surface 158 and terminating as at transitional surface 192, and projecting end surface 166 of transverse wall 40 and extending between transitional surfaces 200 and 202 are preferably generally contained in the same said "highest" plane thereby resulting in all of such projecting end surfaces, as have been described as generally contained in said "highest" plane being furthermost spaced from the general plane of face surface 32 of frontal wall 30.

The "intermediate" plane would generally contain projecting end surfaces 144, 148 and 154 which, for purposes of clarity, may be described as respectively comprising the following. Projecting end surface 144 (of wall 38) would extend as between transitional surfaces 178 and 180 and would include the surfaces of the enlargements 118 and 120 generally circumscribing blind holes or passages 124 and 126, as well as extend for a distance along transverse wall 44 to the transitional surface 194. Projecting end surface 148 (of wall 38) would extend as between transitional surfaces 182 and 184, generally circumscribe the blind hole or passage 128 of enlargement 122 and possibly extend somewhat along transverse wall 48 as to transitional surface 200. Projecting end surface 154 (of wall 40) would extend as between transitional surfaces 186 and 188, generally circumscribe the blind holes or passages 136, 138 and 140 of enlargements 130, 132 and 134, extend for some distance along transverse wall 44 as to transitional surface 196 and possibly extend somewhat along transverse wall 48 to transitional surface 202.

The "lowest" or "closest" plane would generally contain projecting end surfaces 146, 162 and 168 which, for purposes of clarity, may be described as respectively comprising the following. Projecting end surface 146 (of wall 38) would extend as between transitional surfaces 180 and 182. Projecting end surface 162 would extend along medial rib 36 as between transitional surfaces 190 and 192; while projecting end surface 168 would extend (at the same elevation or level of surface 146) along transverse rib 46 from surface 146 until it effectively abutted against the inner side of wall 40 thereby defining a transitional surface 198 as between surfaces 168 and 154. For purposes of disclosure, transitional surfaces 180 and 190 and the right-most (as viewed in FIG. 3) side or edge of enlargement 132 may be considered as being in general alignment; similarly, transitional surfaces 182 and 192 and the left-most (as viewed in FIG. 3) side or edge of enlargement 134 may be considered as being in general alignment.

Accordingly, in view of the foregoing, it can be seen that there is a pocket-like space or recess which is defined at: (a) the left side (as viewed in FIG. 3) by the generally aligned transitional surfaces 180 and 190 and the said right-most side of enlargement 132; (b) the right side (as viewed in FIG. 3) by the generally aligned transitional surfaces 182 and 192 and the said left-most side of enlargement 134; and (c) the relatively higher elevation of projecting end surface 154 (generally between enlargements 132 and 134) as compared to the lower elevation of the projecting end surface 146 of the oppositely disposed wall 38. The benefits of such pocket or recess means will be hereinafter described.

The other cooperating body section 24 is illustrated in FIGS. 5 and 6. As an inspection thereof will show, body sections 22 and 24 are made as to be preferably identical to each other. Therefore, all elements in FIGS. 5 and 6 which correspond to those elements disclosed in FIGS. 3 and 4 are identified with like reference numbers provided with a suffix "a". When the two body sections 22 and 24 are brought together and operatively joined, or connected, as to form the mounting means 12 (as best seen in FIG. 2), the extension or tang 54a of body section 24 is closely received in cooperating recess or keying slot 52 of body section 22, while the extension or tang 54 of body section 22 is closely received in cooperating recess or keying slot 52a of body section 24.

Referring in greater detail to FIG. 7, in conjunction with FIGS. 1 and 2, the upper support means or bar 16 is depicted as preferably comprising a cylindrical steel rod having an axially elongated forwardly (when assembled) disposed portion 210 with oppositely situated arm portions 212 and 214 which, in turn, respectively terminate in inwardly directed axially aligned pivot portions 216 and 218.

Referring in greater detail to FIGS. 8 and 9, in conjunction with FIGS. 1 and 2, the lower support means 14 is depicted as preferably comprising a longitudinally extending support portion 220 which, in turn, as at its opposite ends, has respective arm portions 222 and 226. Such arm portions 222 and 226 are, in turn, respectively provided with depending leg portions 228 and 230. The upper ends (as viewed in FIGS. 8 and 9) of leg portions 228 and 230 are respectively provided with inwardly directed, axially aligned, arm-like portions 232 and 234 which, in turn, are respectively provided with generally upwardly extending arm-like portions 236 and 238. In the preferred embodiment, the ends (respectively comprised of 222, 228, 232, 236 and 226, 230, 234, 238) are formed of cylindrical steel rod material while the support portion 220 is preferably formed of relatively thin flat steel stock which is in turn longitudinally formed as into a 90° "V" configuration (as viewed in FIG. 9) having an upper situated plate-like portion 240 and a depending forwardly disposed portion 242. The longitudinally extending support portion 220 may be fixedly secured to the respective free ends of arm portions 222 and 226, in the configuration depicted, as by, for example, welding.

In the preferred embodiment, end containment plates or members 18 and 20 are also employed. Referring in greater detail to FIGS. 10, 11 and 12, end containment member 20 is illustrated as being comprised of a generally medially disposed main body 244 about the periphery of which is integrally formed a generally continuous flange 246 which, as best seen in FIG. 12, may extend to either side of the main body 244. Further, in the preferred embodiment, what could be considered as the rearwardly situated peripheral flange portion has an outer surface 248 which is generally planar so that such can slidably contact the front face 32a and/or 32 of the mounting means 12.

At the generally lower end, as best seen in FIGS. 10 and 11, the peripheral flange 246 is formed as to have a projecting extension portion 250 which is downwardly spaced from a further forwardly situated and extending flange portion 252. In the preferred embodiment flange portion 252 is generally planar, in its outer surface, and generally normal to the plane of the outer surface of flange portion 248. Because of the relationship and general configurations of flange extension 250 and flange portion 252 a slot-like recess 254 is formed generally therebetween. End containment member 18 (FIGS. 1 and 2) ma be considered as identical to end containment member 20, as described with reference to FIGS. 10, 11 and 12, and both members 18 and 20 may be formed of any suitable material such as, for example, ABS or high impact polystyrene.

The various elements heretofore described when assembled into the storage rack means 10 of FIGS. 1, 2 and 13, will have the following relationships and mode of operation.

The body sections 22 and 24 (FIGS. 3 and 4 and FIGS. 5 and 6) are operatively and effectively joined to each other, in end-to-end relationship by inserting extension 54 (FIG. 3) into cooperating recess 52a (FIG. 5) and simultaneously inserting extension 54a (FIG. 5) into cooperating recess 52 (FIG. 3) as to thereby result in an assembled relationship, therebetween, as generally depicted in FIG. 2 and comprise the support means 12. The upper support means or bar 16 (FIG. 7) has its pivot portions 216 and 218 respectively pivotally received in channel 84 (FIG. 3) and channel 80a (FIG. 5) thereby assuming a relationship as generally depicted in FIG. 1.

The end containment members 18 and 20 each receive the plate-like portion 240 (FIGS. 8 and 9), of the lower support bar or means 14, within their respective slots or recesses 254 (FIGS. 10 and 11) as to have the rearward generally planar surfaces 248—248 in juxtaposition to face surfaces 32 and/or 32a of body sections 22 and 24.

The lower support means 14, in turn, is operatively engaged with body sections 22 and 24 by having one end thereof retained by body section 22 and the other thereof retained by body section 24. More particularly, inwardly directed portion 232 and upwardly directed portion 236 (FIGS. 8 and 9) are respectively simultaneously received in channel 80 and channel 86 of body section 22 (FIG. 3) while the oppositely inwardly directed portion 234 and the cooperating upwardly directed portion 238 (FIGS. 8 and 9) are respectively simultaneously received in channel 84a and 86a of body section 24 (FIG. 5). When such ends of lower support means 14 are thusly received within such channels, portion 232 would lie as against the end surface of boss or pad 88 while portion 236 would lie as against the end surfaces 104 of bosses or pads 92 and 94 (FIG. 3). Similarly, portion 234 would lie against the end surface of boss or pad 90a while portion 238 would lie as against the end surfaces 104a of bosses or pads 102a and 100a (FIG. 5).

The entire assembly 10, mounted to a chosen support structure 256 as by screws extending through passages 116, 114, 116a and 114a, would assume a position as generally depicted in FIGS. 1, 2 and 13.

As is evident from an inspection of FIG. 13, the upper support bar or containment means 16 is rotatable or swingable about its pivot portions (216, 218 FIG. 7) to any number of swingable positions as to thereby correspondingly position its longitudinally extending forward containment bar portion 210 at varying distances away from the frontal face of the support means 12; selected ones of such positions are depicted at 210, 210-1, 210-2 and 210-3 of FIG. 13.

For purposes of illustration, a VHS tape (and as possibly provided with an outer sleeve-like cover as is known in the art), is depicted in phantom line at 26 with the bottom surface or face 26b thereof resting upon the lower support means 14 and, in particular, portion 240 of the longitudinal portion 220 of such support means 14. The back or rear surface 26c of the VHS tape 26 is shown as being in abutting engagement with the juxtaposed forward face of the support means 12. Serving to hold the VHS 26 in such stored position is the upper support means 16 swung downwardly to where the longitudinal portion 210 thereof abuts against the forwardly situated face of the VHS tape or recording 26 as depicted at 210-1. With the VHS tape recording 26 (or a plurality thereof) thusly stored, let it be assumed that it is desired to remove the VHS recording 26 from the storage rack means 10. Such can be done simply as by grasping an upper portion of the VHS recording 26 and lifting it vertically, as in the direction of arrow 258, upwardly from between the front face of the mounting means 12 and the opposed longitudinal portion 210 of upper support means 16. Another way of removing the stored VHS 26 would be to in effect grasp (or tend to lift) the forward lower portion 26b of VHS 26 and generally swing such VHS 26 lower portion forwardly and somewhat upwardly until the lower right (as viewed in FIG. 13) corner thereof passes beyond lower support portion 240 as generally depicted in FIG. 13 by the VHS 26 drawn in position 26-1. At that point, the VHS 26-1 may be slid generally angularly downwardly past support portion 240 until the uppermost portion of VHS 26-1 passes by the upper support longitudinal portion 210. It should now be apparent that as such VHS 26 is being swingably removed, the upper support means 16, if initially in a position as that at 210-1, will also swing somewhat upwardly because of the engagement between the longitudinal portion 210, thereof, and the forwardly disposed face of the VHS 26 being swingably removed.

As should also now be apparent, the storage rack means 10 is capable of storing various sizes of recordings. For example, for recordings which are narrower than that depicted by 26 of FIG. 13, the upper support means 16 would merely swing correspondingly further downwardly from the position of 210-1 until the longitudinal containment portion 210 engaged the forwardly disposed surface of such narrower recording. In effect, the upper support means 16 comprises adjustable containment means for adjusting to the size of the recording and containing such recording as between itself and the opposed surface as 32 and/or 32a.

The end containment means or members 18 and 20, operatively engaged with and guided by portion 240 of lower support means 16, are slidably movable to selected positions as to thereby contain therebetween the various stored recordings as generally depicted in FIGS. 1 and 2 and prevent such stored recordings from possibly falling sideways (as viewed in FIG. 2). It is, of course, possible to eliminate the end containment means 18 and 20, as by their removal, especially in those situations where the entire storage rack means 10 is filled with recordings since at that time the arms 212 and 214 of the upper adjustable containment means 16 would serve to prevent such stored recordings from possibly falling sideways.

In some situations, the size and configuration of the stored recordings may be such as to result in somewhat marginal contact as between the forwardly disposed surface of the recording (or its jacket or cover) and the longitudinal portion 210 of the upper adjustable containment means 16. For example, with compact disc audio (CD) recordings, the longitudinal portion 210 of the swingable containment means 16 may just barely engage the forwardly disposed surface (of the CD recording jacket) at its upper end. Therefore, in those situations the invention provides means whereby the lower support means 14 may be adjusted upwardly, relative to the mounting means 12 and upper containment means 16. More particularly, especially with reference to FIGS. 3, 5 and 13, the invention as herein previously described as being in its assembled state, was described as having the oppositely directed axially aligned portions 232 and 234 of lower support means 14 respectively received in channels 80 and 84a of body sections 22 and 24. Such a resulting relationship is, of course, depicted in FIG. 13. However, if the lower support means 14 is to be raised, such axially aligned portions 232 and 234 would instead be respectively received in channels 82 and 82a of body sections 22 and 24 with the upwardly projecting ends 236 and 238 being respectively received in channel 86 (laid as against bosses 98 and 100) and in channel 86a (laid as against bosses 96a and 94a). As a consequence, of course, the recordings would be raised relative to the pivot means of the upper containment means 16 thereby providing for the greater assured contact as between the recordings and containment portion 210.

In the preferred embodiment, the body sections 22 and 24 are formed identical to each other so that when the two body sections 22 and 24 are assembled to each other (as by the cooperating extensions 54, 54a and recesses 52, 52a, which also function as keying means) there is really no single edge which would have to be the upper edge nor is there any single edge which would have to be the lower edge when assembled with the other related elements. That is, once the body sections 22 and 24 are thusly assembled to each other the upper edge (as in either FIGS. 2 or 13) of the mounting means 12 may be comprised of aligned wall portions 40 and 38a or the upper edge may be comprised of aligned wall portions 38 and 40a. Regardless of which is selected to be the upper edge of the mounting means 12, the attachment of both the upper adjustable containment means 16 and the lower support means 14 is accommodated by symmetrically situated channels formed at the functionally outer ends of both body sections 22 and 24.

Further, as described in detail with reference to FIGS. 3 and 4, in the preferred embodiment a pocket-like clearance or slot is defined as by the plane of edge surface portions 146, 162 and 168 and the cooperating transitional surfaces as 180, 190, 182 and 192 with edge surface 154 extending significantly above the level of edge surface portion 146 thereby having that portion of wall 40 directly opposite to surface portion 146 function as an end stop or closure of the pocket or recess. The same, of course, exists in body section 24 of FIGS. 5 and 6.

It will be noted that when the body sections 22 and 24 are operatively connected to each other (via 54, 52a and 54a, 52), the opening to the pocket in body section 22 is from a first longitudinal side of the mounting means 12 while the opening to the pocket or recess in body section 24 is from the opposite longitudinal side of the mounting means 12. Such pocket means opening is depicted as being comprised of 182a, 146a and 180a of FIG. 1. (For ease of reference such pocket or recess will be identified by reference number 260a.) It will also be noted that when the mounting means 12 is applied or secured to the associated support structure 256 (as in FIGS. 1 or 13) that such support structure 256 serves to establish or provide the remaining confining plane defining the overall pocket or recess 260a. Such pocket or recess 260a may then be employed for the placement therein of related accessory means.

Figure 15:
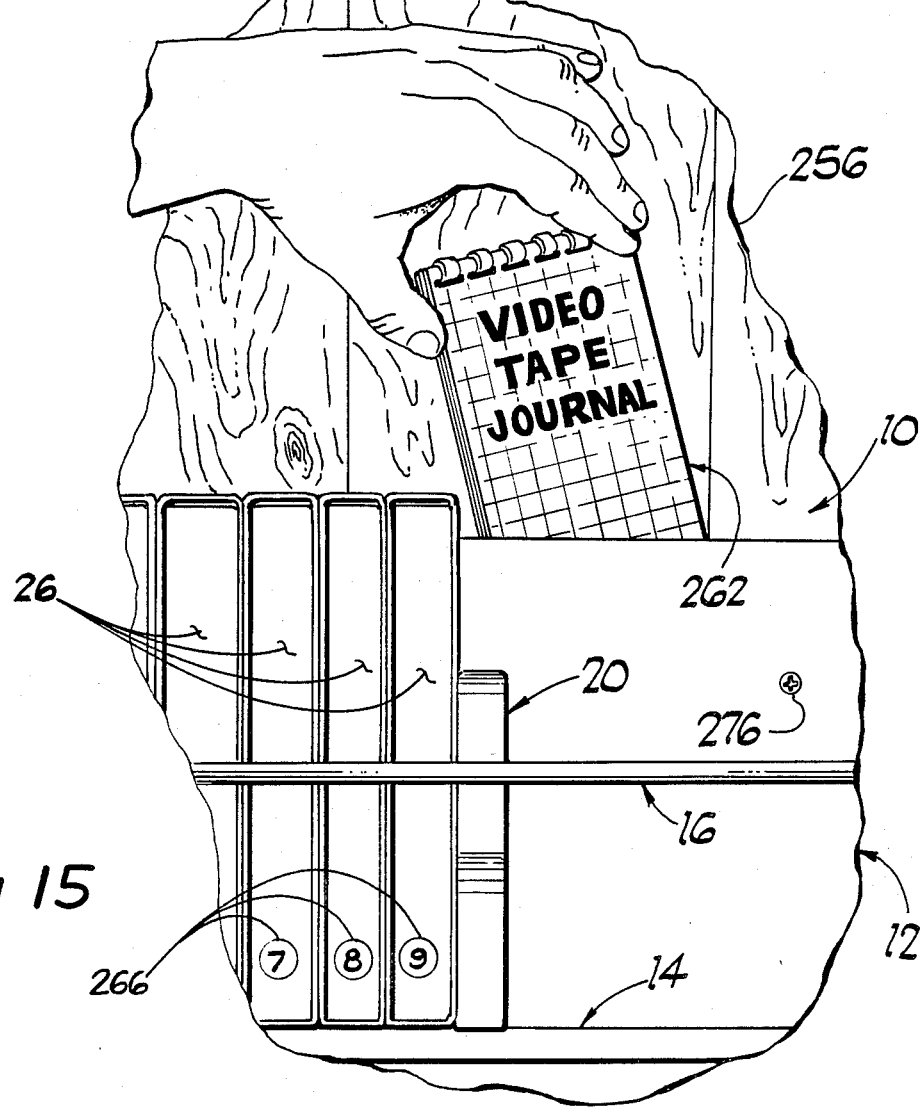
FIG. 15 is a relatively enlarged view of a fragmentary portion of the apparatus of FIG. 14 illustrating a particular feature thereof.

More particularly, and referring primarily to FIGS. 1, 13, 14 and 15, with the storage rack assembly 10 being mounted to suitable associated support structure 256, a journal-like book or index means 262 may be slidably inserted into and received within the pocket or recess 260a. As depicted in FIG. 14, when such journal means 262 is thusly received, the upper illustrated portion 264 thereof may well extend only to a height which is below the tops of the stored VCR tapes 26 which would, of course, enhance the overall appearance. As depicted in FIG. 15, the journal means 262 may be easily and slidably removed from the storage recess means 260a merely as by grasping the upper end thereof and lifting the journal means 262 from the recess means 260a.

Referring further to FIGS. 14 and 15, it can be seen that the various depicted VCR tapes 26 are provided with coded type indicia means 266 which, preferably, may take the form of self-adhesive numbered labels or the like. In the embodiment disclosed such indicia means 266 are respectively provided with sequential numbers (depicted as being 1-9). Such numbers (1-9) are then employed as index codes which are entered in the journal means 262 to therein indicate the subject matter recorded on the respective VCR tapes 26. Therefore, it makes it easy to select the particular VCR tape 26 desired, as for playback, by first looking in the journal means 262 for the desired subject matter and then withdrawing only the correspondingly coded VCR tape 26 from the storage rack means 10. Further, it is contemplated (and preferred) that the journal means 262 be visibly coded to the indicia means 266. More particularly, in the preferred form, the cover or some other readily visible portion of the journal means 262 as well as that visible portion of the indicia means 266 generally surrounding the respective code numbers (1-9 etc) be of the same color as to thereby constitute an indexing set. For example, one such indexing set could have red as its unifying color. Such indexing set would then be employed as with a (for example) single storage rack assembly 10 and the recordings stored thereon. Another indexing set could have blue as its unifying color and it would then be employed as with a (for example) second single storage rack assembly 10 and the recordings stored thereon. Still other colors could be employed as unifying colors in respective other indexing sets. The effect of such would be that if, for example, three storage rack means 10 were employed to store recordings thereon, and if a "No. 7" VCR recording 26 were removed from each of the three storage rack means, there would be no confusion a to which of such removed "No. 7" VCR recordings was to be replaced into which of the three storage rack means 10. The proper one of the storage rack means 10 would become self-evident from the unifying color employed for that storage rack 10 in the indicia means 266 thereof. Further, by having the respective journal means 262 coded by the unifying color, if two or more journal means 262 were to be simultaneously removed from two or more storage rack means 10, the replacement of such journal means 262 into the recess of the proper storage rack means 10 would again be self-evident since the visible indicia 266 on the stored VCR recordings would indicate which color of journal means properly belongs to that particular storage rack means 10.

Throughout the description hereinbefore presented, reference is made to the fact that the mounting means 12 and/or storage rack means 10 is secured to suitable associated support structure 256. Such support structure may take various forms. For example, as generally depicted in FIGS. 14 and 15, such support structure 256 may actually comprise a portion of a wall structure of a room; further, the support structure 256 may comprise a door to, for example, a closet thereby enabling the storage rack means 10 to be mounted as onto the rear of such door thereby keeping the storage rack means 10, and the recordings carried thereby, out of sight whenever such assumed closet door is closed. Also, by way of further example, the support structure 256 may comprise a portion of a cabinet door so that if the storage rack 10 were to be mounted as to the rear side of it, the storage rack 10 and recordings carried thereby would also be out of sight when the assumed cabinet door is closed.

Figure 16:
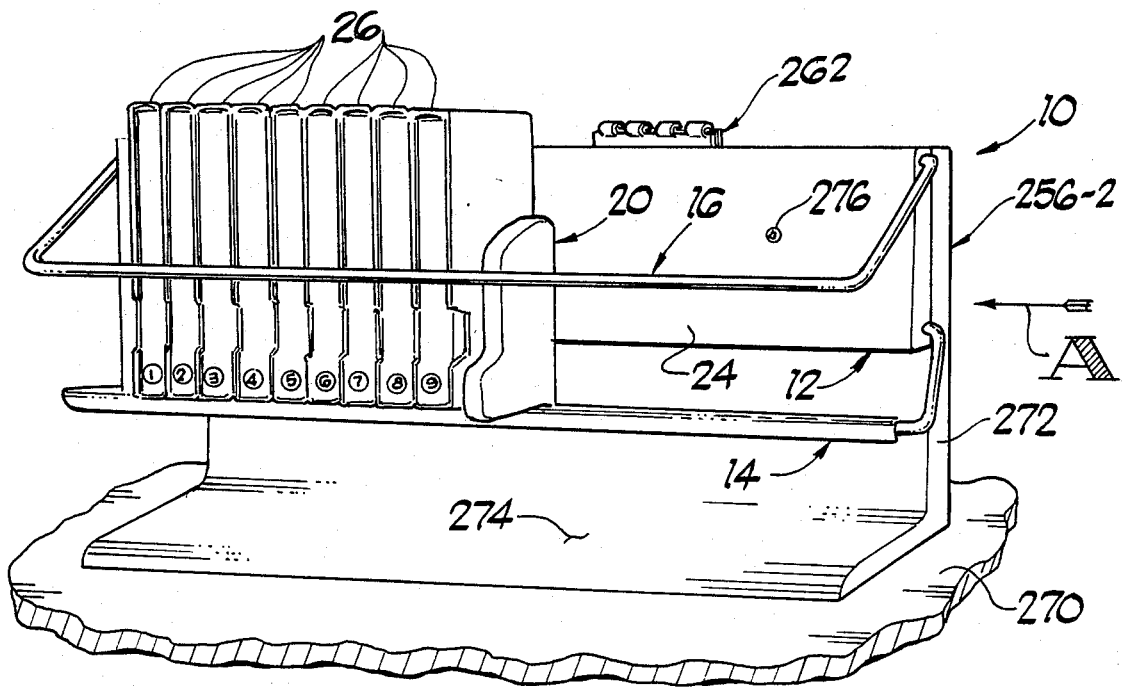
FIG. 16 is a view somewhat similar to that of FIG. 14 but illustrating the storage rack provided with its own support means.
Figure 17:
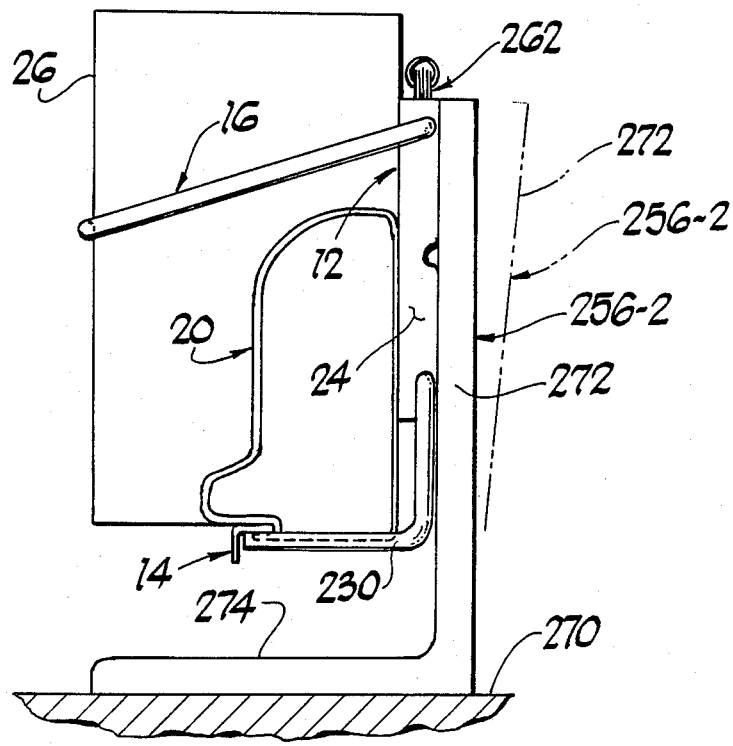
FIG. 17 is a relatively enlarged view taken generally in the direction of arrow A of FIG. 16.

The support structure 256 may take yet another form. For purposes of being able to more easily refer to such other form of support structure reference thereto will be made by reference number 256-2. Referring now in greater detail to FIGS. 16 and 17, the storage rack 10 may be suitably secured to support structure 256-2 as to thereby result in an overall free-standing storage structure which can be placed as atop a table, bench, shelf or any other suitable support surface means 270. Even though the support structure 256-2 may be of any suitable configuration and of any suitable material, as depicted, support structure 256-2 is formed of plastic material, such as ABS or high impact polystyrene, and molded as to have a relatively rearwardly disposed generally upwardly extending wall portion 272 integrally joined to a lower disposed generally laterally extending base or foot means or portion 274. In the embodiment of FIGS. 16 and 17 the length of vertical wall portion 272 is substantially equal to the length of the mounting means 12 (body sections 22 and 24 being assembled to each other). Also, the base 274 is depicted as being of continuous form of a length the same as that of vertical wall portion 272. The base 274, of course, may be made-up of spaced foot-like portions respectively situated as at or near the ends of the support structure 256-2 vertical wall portion 272. Further, the forward-most wall portion of the vertical wall 272 may have integrally molded extensions which are closely received as within any or all of blind holes 124, 126, 128, 136, 138 and 140 of body section 22 (FIGS. 3 and 4) and any or all of blind holes 140a, 138a, 136a, 128a, 126a and 124a of body section 24 (FIGS. 5 and 6) as to thereby readily locate the assembled body sections 22 and 24 against wall portion 272 while screws (such as 276) passing through the clearance passages 116 and 114 of body section 22 and clearance passages 114a and 116a of body section 24 serve to secure the mounting means 12, and elements carried thereby or connected thereto, to the generally vertically extending support wall portion 272. If desired, the support structure 256-2 may be formed as to have its mounting or support wall portion 272 significantly inclined to the vertical as generally depicted in phantom line in FIG. 17.

Figure 18:
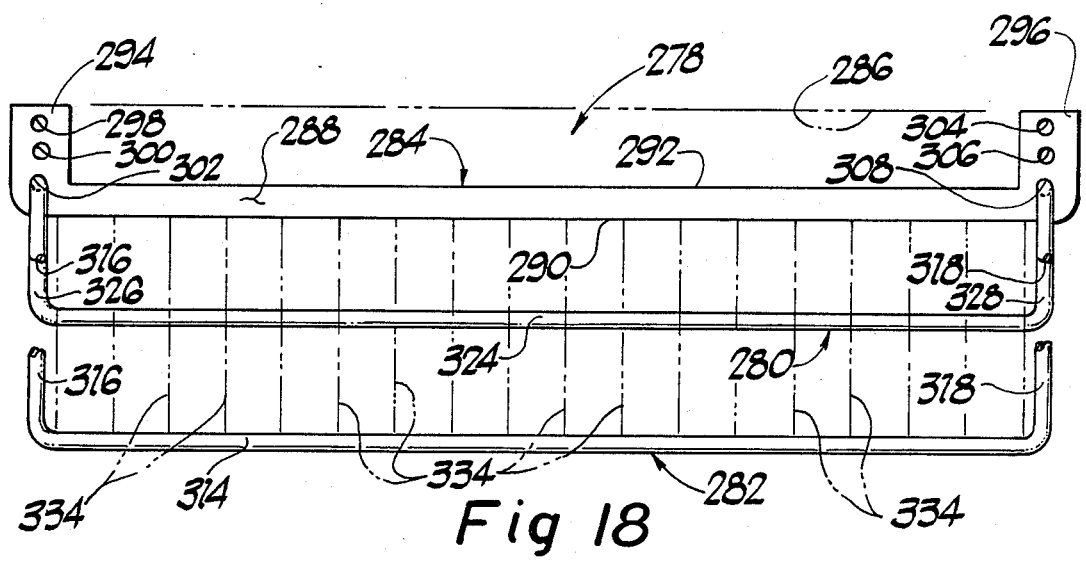
FIG. 18 is a top plan view of another form of storage rack employing teaching of the invention.
Figure 19:
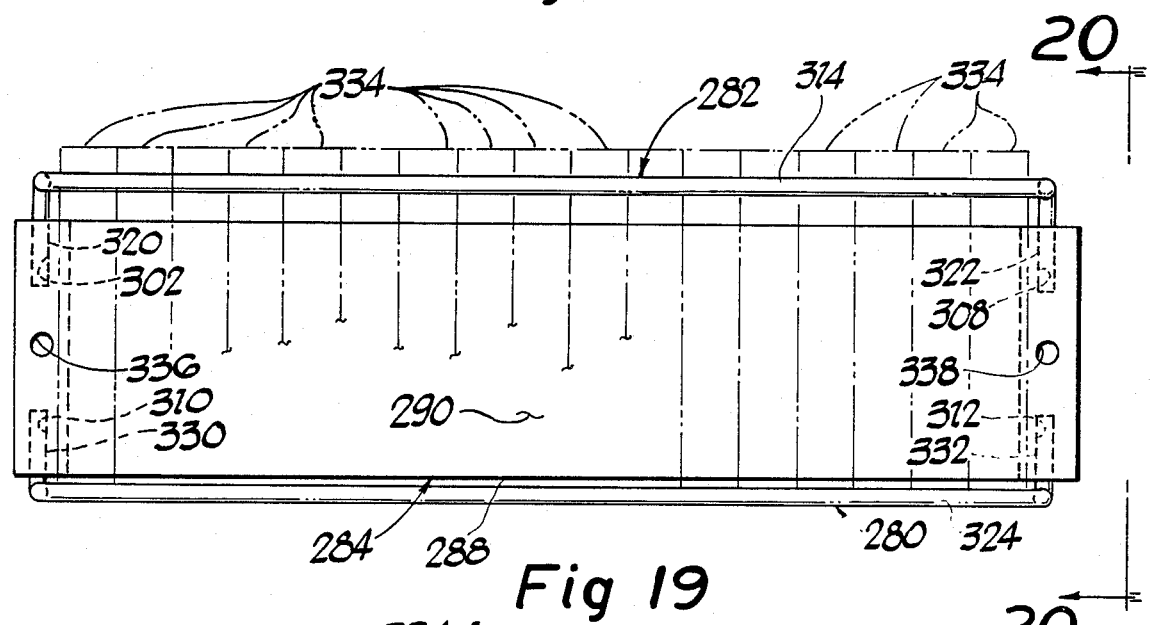
FIG. 19 is a front elevational view of the storage rack of FIG. 18.
Figure 20:
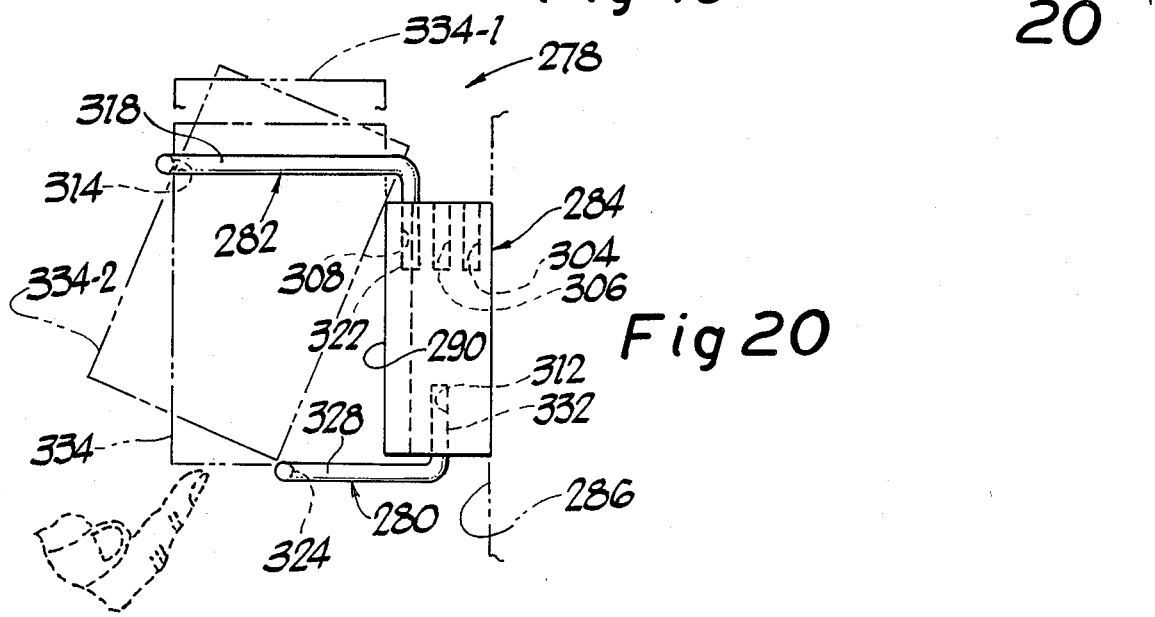
FIG. 20 is a view taken generally on the plane of line 20—20 of FIG. 19 and looking in the directions of the arrows.

FIGS. 18, 19 and 20 illustrate another form of the invention. In the embodiment of FIGS. 18, 19 and 20, the storage rack means 278 is illustrated as comprising a lower disposed bottom support means 280 and relatively upwardly situated retainer means 282 each operatively carried by a mounting means 284 which, in turn, when operatively employed, is suitably secured to associated support structure 286.

In the embodiment illustrated, the mounting means 284 is depicted as being of generally U-shaped configuration (as viewed in FIG. 18) having a longitudinally extending main body portion 288, with forwardly and rearwardly disposed surfaces 290 and 292, having leg-like rearwardly projecting end portions 294 and 296.

Rearwardly directed end portion 294 has formed therein a plurality of passages 298, 300 and 302 which may be blind passages not extending entirely through portion 294; similarly, rearwardly directed end portion 296 has formed therein a plurality of passages 304, 306 and 308 which also may be of the blind type. At the lower ends of the end portions 294 and 296 respective upwardly directed passages 310 and 312 are formed and such, too, may be of the blind type.

The upper disposed support or containment means 282 is preferably formed of cylindrical rod like metal and formed as to be in a U-shaped configuration (as viewed in FIG. 18) with a longitudinally extending bight portion 314 and oppositely disposed leg portions 316 and 318 which, in turn, respectively terminate in downwardly extending projections or free end portions 320 and 322.

Somewhat similarly, the lower disposed support means 280 is preferably formed of cylindrical rod like metal and formed as to be in a U-shaped configuration (as viewed in FIG. 18) with a longitudinally extending bight portion 324 and oppositely disposed leg portions 326 and 328 which, in turn, respectively terminate in upwardly extending projections or free ends 330 and 332.

All of such passages or blind holes 298, 300, 302, 304, 306, 308, 310 and 312 are preferably of a size as to provide for at least a close or slight interference fit with the various free end projections 320, 322, 330 and 332 when received therein.

In operation, the distance which longitudinally extending containment means or portion 314 extends away from the forward surface 290 of mounting means 284 is also adjustable. That is, downwardly depending free end portions 320 and 322 may be selectively respectively inserted into receiving passages 302 and 308 or 300 and 306 or 298 and 304 depending upon the physical size of the VCR recordings 334 to be contained between longitudinal portion 314 and mounting means 284.

The entire storage rack means 278 may be suitably secured to the associated support structure 286 as by screws (not shown) for which clearance passages 336 and 338 are formed through the end portions 294 and 296. The support structure 286 may take any of the forms as hereinbefore described, as at 256 and 256-2, with reference to FIGS. 1–17.

With the storage rack means 284 assembled (as described and as generally depicted) and secured to the associated support structure, any of the VCR recordings 334 may be selectively removed therefrom as by pushing the selected VCR recording generally directly upwardly, as to a position as depicted in phantom line at 334-1, and then lifting the VCR recording from the storage rack means 278, or, the bottom of the selected VCR recording may be swung generally forwardly as to a position depicted in phantom line at 334-2 and then slid generally downwardly and outwardly. Both of such methods of removal of selected VCR recordings have also been discussed with reference to FIG. 13.

Figure 21:
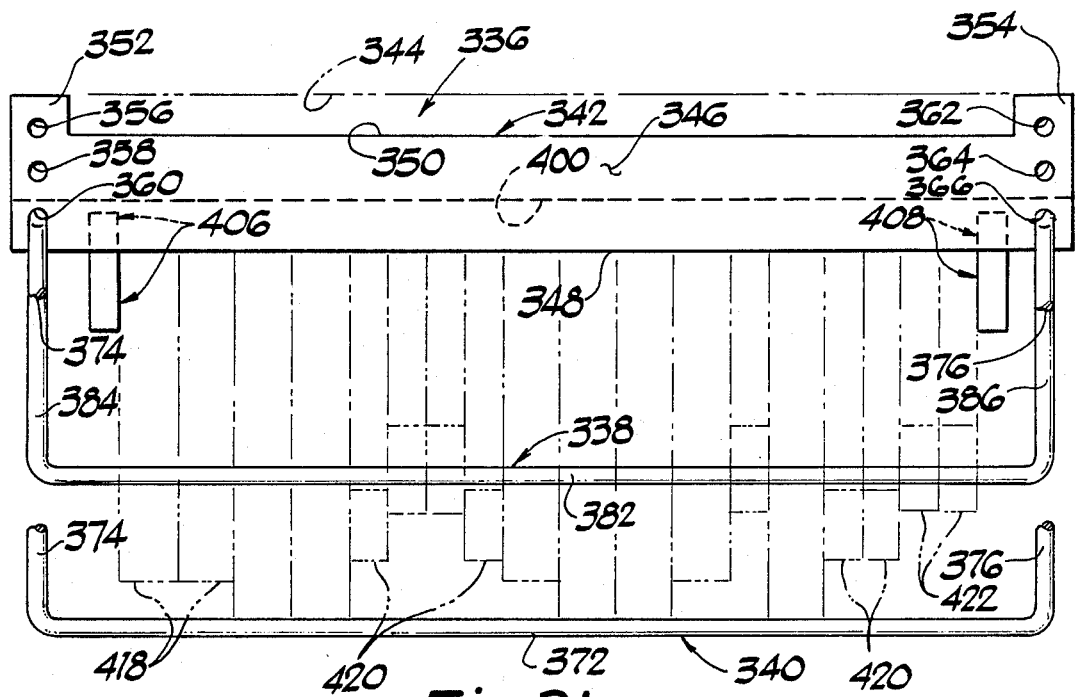
FIG. 21 is a top plan view of still another form of storage rack employing teachings of the invention.
Figure 22:
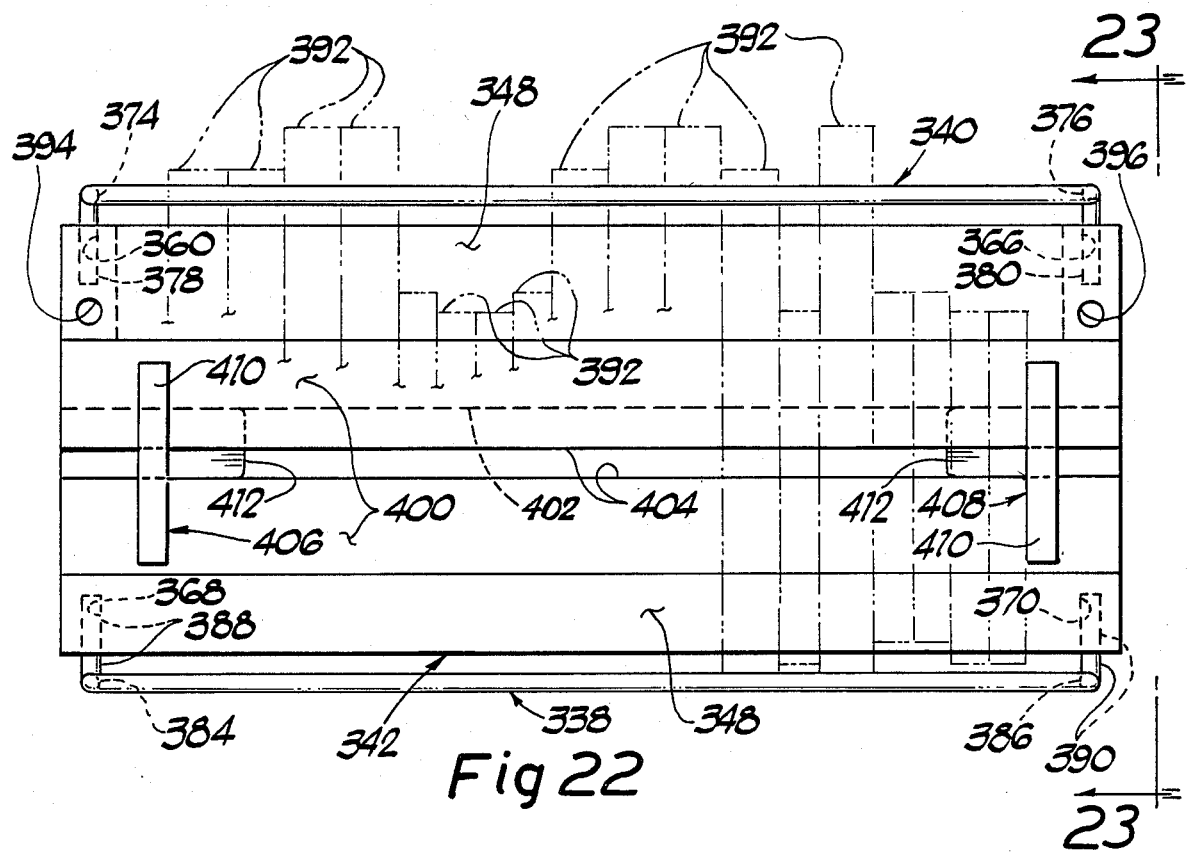
FIG. 22 is a front elevational view of the storage rack of FIG. 21.
Figure 24:
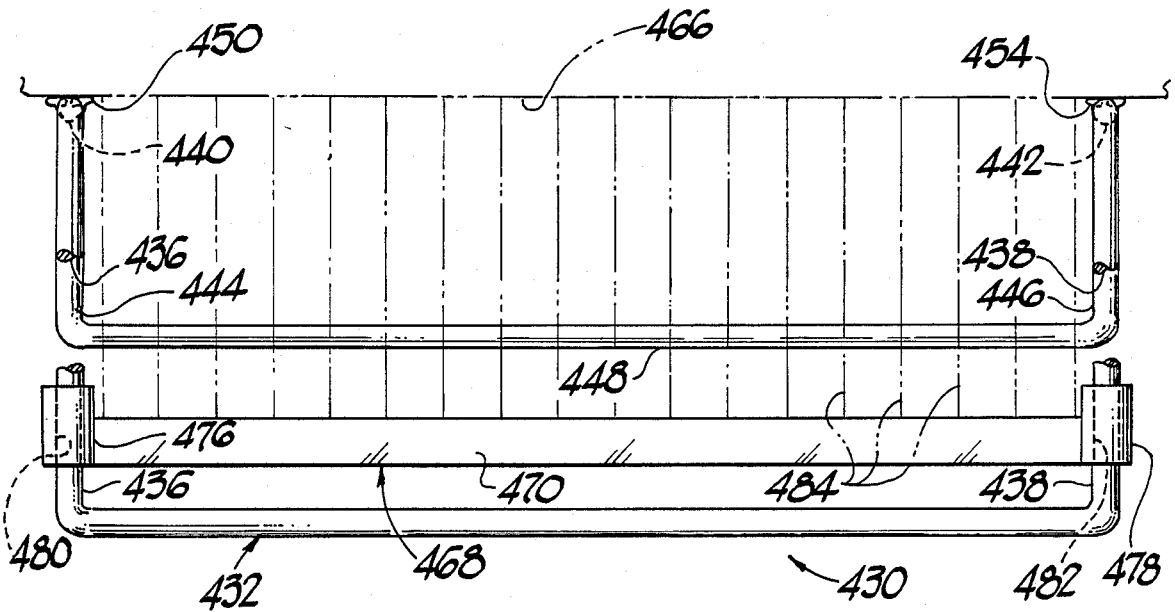
FIG. 24 is a top plan view of yet another form of storage rack employing teachings of the invention.
Figure 25:
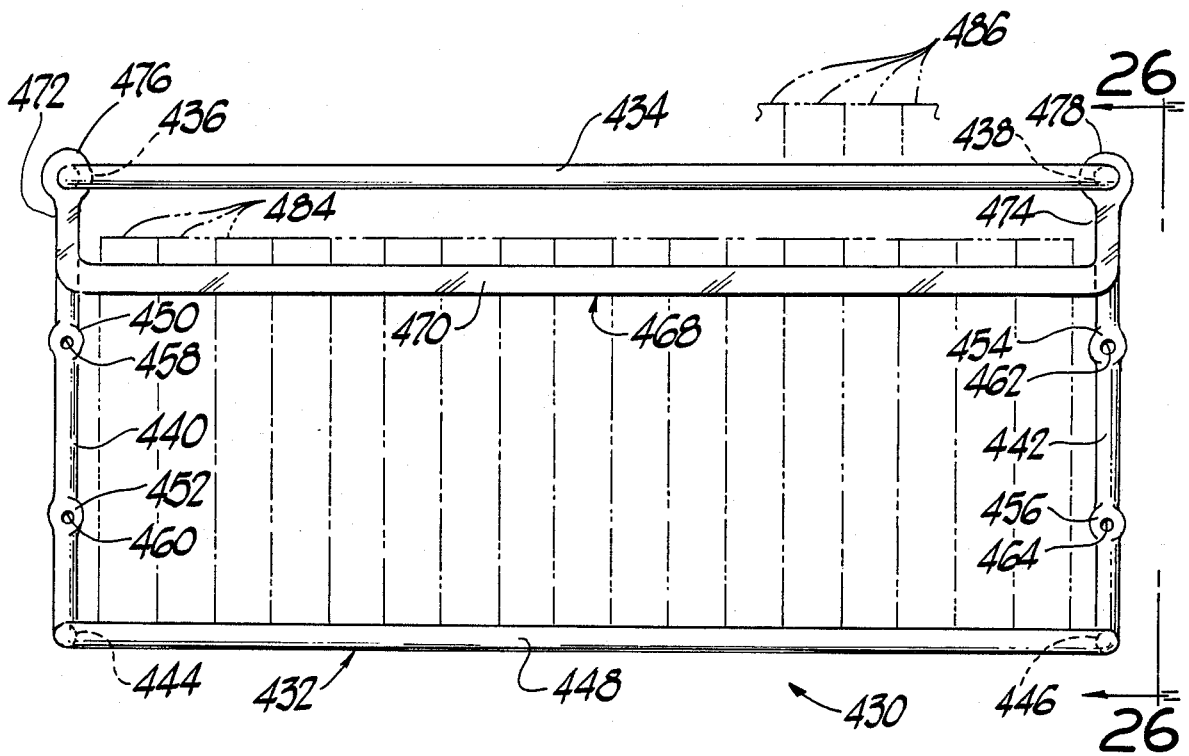
FIG. 25 is a front elevational view of the storage rack of FIG. 24.

FIGS. 21, 22 and 23 illustrate another form of the invention. In the embodiment of FIGS. 21, 22 and 23, the storage rack means 336 is illustrated as comprising a lower disposed bottom support means 338 and relatively upwardly situated retainer means 340 each operatively carried by a mounting means 342 which, in turn, when operatively employed, is suitably secured to associated support structure 344.

In the embodiment illustrated, the mounting means 336 is depicted as being of generally U-shaped configuration (as viewed in FIG. 21) having a longitudinally extending main body portion 346, with forwardly and rearwardly disposed surfaces 348 and 350, having leg-like rearwardly projecting end portions 352 and 354.

Rearwardly directed end portion 352 has formed therein a plurality of passages 356, 358 and 360 which may be blind passages not extending entirely through portion 352; similarly, rearwardly directed end portion 354 has formed therein a plurality of passages 362, 364 and 366 which also may be of the blind type. At the lower ends of the end portions 352 and 354 respective upwardly directed passages 368 and 370 are formed and such, too, may be of the blind type.

The upper disposed support or containment means 340 is preferably formed of cylindrical rod like metal and formed as to be in a U-shaped configuration (as viewed in FIG. 21) with a longitudinally extending bight portion 372 and oppositely disposed leg portions 374 and 376 which, in turn, respectively terminate in downwardly extending projections or free end portions 378 and 380.

Somewhat similarly, the lower disposed support means 338 is preferably formed of cylindrical rod like metal and formed as to be in a U-shaped configuration (as viewed in FIG. 21) with a longitudinally extending bight portion 382 and oppositely disposed leg portions 384 and 386 which, in turn, respectively terminate in upwardly extending projections or free ends 388 and 390.

All of such passages or blind holes 356, 358, 360, 362, 364, 366, 368 and 370 are preferably of a size as to provide for at least a close or slight interference fit with the various free end projections 378, 380, 388 and 390 when received therein.

In operation, the distance which longitudinally extending containment means or portion 372 extends away from the forward surface 348 of mounting means 342 is also adjustable. That is, downwardly depending free end portions 378 and 380 may be selectively respectively inserted into receiving passages 360 and 366 or 358 and 364 or 356 and 362 depending upon the physical size of the VCR recordings 392 to be contained between longitudinal portion 340 and mounting means 342.

The entire storage rack means 336 may be suitably secured to the associated support structure 334 as by screws (not shown) for which clearance passages 394 and 396 are formed through the end portions 352 and 354. The support structure 344 may take any of the forms as hereinbefore described, as at 256, 256-2 and 286, with reference to FIGS. 1–20.

Generally, it should now be apparent that, to the extent now described, there is similarity as between the forms of the inventions disclosed in FIGS. 18, 19 and 20 and FIGS. 21, 22 and 23. However, the differences therebetween will be better understood if, in particular, FIGS. 22 and 23 are further considered.

In the preferred embodiment of the form of the invention disclosed by FIGS. 21, 22 and 23, the frontal face or surface 348 is generally interrupted as by a longitudinally extending inclined surface 400 formed as into the mounting means 342. Further, longitudinally extending guide slot means 402 may also be formed into mounting means 342 and, as best seen in FIGS. 22 and 23, such guide means 402 may comprise a generally coextensive opening 404 formed into mounting means 342 and opening into the inclined surface 400.

A pair of end containment means or members 406 and 408 are operatively slidably contained by the guide means 402 and slidably movable therealong generally toward and away from each other. As typically illustrated by end containment means 408, each of such containment means is preferably comprised of a main body portion 410, a slide portion 412 and an interconnection 414. The slide portion 412 is guidingly slidably received within guide means 402 thereby, through the interconnection 414, enabling the end containment member bodies 410—410 to be selectively movable toward and away from each other and thereby be effective to engage the stored VCR tapes and assist in maintaining them in a generally vertically stored position.

In FIG. 22, the various stored recordings (shown in phantom line) are identified generically by the reference number 392 as VCR recordings. However, as best illustrated in FIG. 23, such VCR recordings are clearly depicted as being comprised of various types of recordings as, for example, a VHS recording 416, a Beta recording 418, a "C" format recording 420 and an 8 mm. recording 422. As will be evident from especially FIG. 23, the physical size of the "C" format 420 and 8 mm. 422, being considerably smaller than either the VHS 416 or Beta 418, are enabled to be leaned generally rearwardly as to have their respective rearward end surfaces abut against the inclined surface 400 thereby shifting the respective centers of gravity thereof further rearwardly of the lower support member 382. When thusly positioned, the end containment members 406 and 408 may be brought thereagainst further enhancing the stability of the stored recordings.

As in the form of the invention in FIGS. 18, 19 and 20, the upper support means 340 is also adjustable by selectively engaging the depending ends 378 and 380 into the available receiving holes 360, 366 or 358, 364 or 356, 362.

FIGS. 24, 25, 26 and 27 illustrate yet another form of storage rack employing teachings of the invention. Referring in greater detail to FIGS. 24–27, the storage rack 430 is depicted as comprising, in the main, a unitary structure comprised, for example, of a continuous cylindrical steel rod bent or formed as to provide for the various portions hereinafter described.

More particularly, the continuous rod 432 is depicted as having a longitudinally extending upper portion 434 with rearwardly extending support arm portions 436 and 438 which, in turn, are respectively downwardly (generally vertically) continued by mounting legs 440 and 442 which comprise mounting means. At the lower ends of legs 440 and 442 are respective forwardly extending arms 444 and 446 each of which are joined to a longitudinally extending lower support portion 448.

In the preferred form of the storage rack 430, the mounting means or legs 440 and 442 are formed as with indented or flatted portions 450, 452, 454 and 456 through which are respectively formed through holes or passages 458, 460, 462 and 464 for the reception therein of suitable screws (not shown), or the like, for mountingly securing the storage rack 430 to associated support structure 466. The support structure 466 may take any of the forms as hereinbefore described, as at 256, 256-2, 286 and 344, with reference to FIGS. 1-23.

The upper support arms 436 and 438 collectively slidably carry a longitudinally extending abutment member 468 which, as depicted, is preferably comprised of a main body portion 470 and opposite upwardly directed end portions 472 and 474. As shown in each of FIGS. 24-27, the respective upper ends of portions 472 and 474 are provided with what may be considered as enlargements 476 and 478 which, in turn, by means of passages 480 and 482 formed therein, receive upper arms 436 and 438 therethrough. The abutment member 468 in concert with coacting arms 436 and 438 serves as adjustable upper support means in holding the recordings, stored atop the lower support means 448, as against the frontal surface of the associated support structure 466. More particularly, referring to FIG. 26, if the recordings should be of relatively small physical size, as depicted in phantom line at 484, the abutment means 468 can be adjustably slid (along arms 436 and 438) toward the recording 484 until the longitudinal portion 470 thereof abuts against the forwardly disposed surface of recording 484. Also, if larger recordings are to be stored, as fragmentarily illustrated in phantom line at 486, the abutment means 468 can be slid to the left (as viewed in FIG. 26) until the position of longitudinal portion 470 accommodates the size of such recording 486. It should be noted that as depicted in FIG. 26 both the height and width of recording 486 are greater than that of recording 484; nevertheless, if the abutment means 468 were adjusted to accommodate the larger recording 486, the smaller recording 484 would still be retained in the storage rack 430 because the ends 472 and 474 extend sufficiently downwardly as to place the longitudinal abutment portion 470 within the path of movement should the smaller recording 484 (for some reason) be jarred forwardly toward portion 470.

The abutment means 468 may, of course, be made of any suitable material. However, in the preferred embodiment of the form disclosed, the abutment means 468 would be comprised of relatively rigid plastic material somewhat elastomerically deformable. That is, each of the enlargements 476 and 478, as typically depicted by 478 in FIG. 27, may be provided with a slot-like opening 490 which, when elastomerically pried further open permits the insertion therethrough of the cooperating arm (as 438 in FIG. 27) into the receiving passage (as 482 in FIG. 27).

Although only a preferred embodiment and a select number of other forms of the invention have been disclosed and described, it is apparent that other embodiments and modifications of the invention are possible within the scope of the appended claims.

What is claimed is:

1. A storage rack for the storage of recordings and the like, comprising mounting means, relatively lower disposed lower support means carried by said mounting means, relatively upper disposed upper support means carried by said mounting means, wherein said mounting means is securable to associated support structure, wherein said lower support means is effective to engage a lower portion of each of such recordings as are placed generally thereatop to thereby provide for generally vertical support of each of such recordings, wherein when said recordings are placed atop said lower support means a first edge of said recordings is disposed at least relatively close to said support structure and a second edge of said recordings opposite to said first edge is disposed at a distance further away from said support structure, wherein said upper support means is situated at an elevation above the elevation of said lower support means, wherein said upper support means is effective to engage the second edge of said recordings as to thereby generally contain said stored recordings between said upper support means and said support structure, wherein said lower support means engages said lower portions of said recordings placed thereatop at a first maximum distance away from said mounting means, wherein said upper support means engages said second edge of said recordings placed atop said lower support means at a second distance away from said mounting means, wherein said second distance is greater than said first maximum distance, wherein said mounting means comprises body means, said body means comprising first and second body sides and first and second body ends, wherein said first body side is effective to be disposed next adjacent said support structure, wherein said second body side is oppositely disposed to said first body side and effective to be disposed next adjacent said recordings, first passage means formed in said body means at least near said first body end, second passage means formed in said body means at least near said second body end, wherein said first passage means comprises at least first and second passages, wherein said second passage means comprises at least third and fourth passages, wherein said upper support means comprises a first U-shaped member of a generally U-shaped configuration having a first elongated bight portion joining spaced first and second legs, wherein said first leg comprises a first pivot portion pivotally received in said first passage, wherein said second leg comprises a second pivot portion pivotally received in said third passage, wherein said lower support means comprises a second U-shaped member of a generally U-shaped configuration having a second elongated bight portion joining spaced third and fourth legs, wherein said third leg comprises a first non-pivotal connecting portion received in said second passage, wherein said fourth leg comprises a second non-pivotal connecting portion received in said fourth passage, said first and second non-pivotal connecting portions being effective to maintain said second U-shaped member in a fixed relationship with respect to said body means as to have said second elongated bight portion spaced from said second body side, wherein when said recordings are placed atop said lower support means said lower portions of said recordings are engaged by said second elongated bight portion, and wherein said upper support means engages said second edge of said recordings by means of said first elongated bight portion, wherein said first passage means further comprises a fifth passage, wherein said second passage means further comprises a sixth passage, wherein said first pivot portion may selectively be received in any of said first fifth or second passages while said second pivot portion may correspondingly selectively be received in any of said third sixth or fourth passages, and wherein said first non-pivotal portion may selectively be received in any of said second fifth or first passages while said second non-pivotal portion may correspondingly be received in any of said fourth sixth or third passages.

2. A storage rack according to claim 1 wherein said second elongated bight portion comprises an elongated upwardly directed generally flat mounting surface for engaging said lower portion of said recordings.

3. A storage rack according to claim 2 wherein said generally flat mounting surface is comprised of a thin elongated flat member comprising said second bight portion.

4. A storage rack according to claim 3 and further comprising first and second end containment means, said end containment means being movable relative to said lower support means and said body means as to be movable toward and away from said recordings as are placed atop said lower support means, said end containment means being movable toward said recordings as are placed atop said lower support means as to contain said recordings between said first and second end containment means and thereby enhance the vertical stability of said recordings, and wherein each of said first and second end containment means comprises an end member slidably engaged with said elongated flat member as to be guidingly slidable with respect to said elongated flat member.

5. A storage rack according to claim 4 wherein each of said end members comprises a slot-like opening formed in a lower portion thereof, and wherein said elongated flat member is at least partly received in said slot-like opening.

6. A storage rack according to claim 1 wherein said body means comprises an upper side body edge and a lower side body edge, and further comprising recess means formed in said body means through said upper side body edge and generally between said first and second body sides, said recess means providing for the reception therein of associated accessory means.

7. A storage rack according to claim 1 wherein said body means comprises first and second separate body sections, wherein said first and second body sections are substantially identical to each other, wherein each of said first and second body sections has a joining end, and wherein each joining end of said first and second body sections comprises an extending tang-like portion and a recess portion whereby when said first and second body sections are joined to each other at their joining ends the tang-like portion of the first body section is received by the recess portion of said second body section and the tang-like portion of the second body section is received by the recess portion of said first body section.

8. A storage rack according to claim 1 wherein said support structure comprises a free-standing stand-like means secured to said body means as at the first side of said body means, said stand-like means being effective to support said body means and upper and lower support means atop of and vertically spaced from a lower disposed associated supporting surface.

9. A storage rack according to claim 1 and further comprising first and second end containment means, said end containment means being movable relative to said lower support means as to be movable toward and away from said recordings as are placed atop said lower support means, said end containment means being slidably moveable toward said recordings as are placed atop said lower support means as to contain said recordings between said first and second end containment means and thereby enhance the vertical stability of said recordings.

10. A storage rack according to claim 9 wherein said first and second end containment means are carried by said lower support means.

11. A storage rack according to claim 9 wherein said first and second end containment means are slidably connected to said lower support means and mechanically contained between said lower support means and said mounting means.

12. A storage rack according to claim 9 wherein said first and second end containment means are slidably connected to and carried by said mounting means.

13. A storage rack for the storage of recordings and the like, comprising mounting means, said mounting means comprising elongated body means having opposed upper and lower relatively long body side edges and opposed first and second relatively short body end edges, said elongated body means further-comprising opposed relatively rearwardly and forwardly situated surface means, wherein said forwardly situated surface means extends for at least most of the distance between said upper and lower relatively long body side edges and extends for at least most of the distance between said first and second relatively short body end edges, relatively upper disposed upper support means carried by said mounting means, wherein said upper support means comprises a first U-shaped member of a generally U-shaped configuration having a first elongated bight portion joining spaced first and second legs, first journal means carried by said elongated body means and situated at said first relatively short body edge generally between said rearwardly and forwardly situated surface means, second journal means carried by said elongated body means and situated at said second relatively short body edge generally between said rearwardly and forwardly situated surface means, wherein said first leg comprises a first pivot portion connected to said first journal means, wherein said second leg comprises a second pivot portion connected to said second journal means, wherein with said first and second pivot portions being connected to said first and second journal means said first elongated bight portion is situated forwardly of said forwardly situated surface means, relatively lower disposed lower support means carried by said mounting means, wherein said lower support means comprises a second U-shaped member of a generally U-shaped configuration having a second elongated bight portion joining spaced third and fourth legs, wherein said third and fourth legs are connected to said elongated body means as to maintain said second elongated bight portion in a fixed position relative to said elongated body means, wherein when in said fixed position said second elongated bight portion is situated relatively forwardly of said forwardly situated surface means, wherein said first U-shaped member is pivotably swingable about said first and second journal means, wherein said first and second legs are each of a length whereby said first U-shaped member is pivotally swingable upwardly to an upper-most position whereat said first elongated bight portion attains an elevation substantially above the elevation of said upper relatively long body side edge, wherein said first and second legs are each of a length whereby when said first U-shaped member is pivotably swung from said upper-most position and toward a lower-most position said first elongated bight portion traverses a position which is disposed forwardly of said forwardly situated surface means a distance substantially greater than the distance by which said second elongated bight portion is disposed forwardly of said forwardly situated surface means, wherein said second elongated bight portion is effective for providing generally upward support to such recordings and the like as are placed thereatop, and wherein when said first U-shaped member pivotally swings downwardly said lower-most position is determined by the engagement of said first elongated bight portion with at least certain of such recordings and the like as are placed atop said second elongated bight portion thereby having said first elongated bight portion form a gate-like retainer generally containing said recordings and the like as are placed atop said second elongated bight portion between said first elongated bight portion and said forwardly situated surface means and maintaining said recordings and the like atop said second elongated bight portion.

14. A storage rack according to claim 13 and further comprising support structure means for securable connection to said elongated body means, said support structure means comprising free-standing stand-like means secured to said elongated body means as to be disposed at said rearwardly situated surface means, said stand-like means being effective to support said elongated body means and upper and lower support means atop of and vertically spaced from a still lower disposed associated supporting surface.

15. A storage rack according to claim 13 wherein said second elongated bight portion comprises an elongated upwardly directed generally flat mounting surface for engaging such of said recordings as are placed thereatop.

16. A storage rack according to claim 15 wherein said generally flat mounting surface is comprised of a thin elongated flat member.

17. A storage rack according to claim 16 and further comprising first and second end containment means, said end containment means being movable relative to said lower support means and said body means as to be movable toward and away from said recordings as are placed atop said lower support means as to contain said recordings between said first and second end containment means and thereby enhance the vertical stability of said recordings, and wherein each of said first and second end containment means comprises an end member slidably engaged with said elongated flat member as to be guidingly slidable with respect to said elongated flat member.

18. A storage rack according to claim 17 wherein each of said end members comprises a slot-like opening formed in a lower portion thereof, and wherein said elongated flat member is at least partly received in said slot-like opening.

19. A storage rack according to claim 13 and further comprising recess means formed in said body means through said upper relatively long body side edge and generally between said rearwardly and forwardly situated surface means, said recess means providing for the reception therein of associated accessory means.

20. A storage rack according to claim 13 wherein said body means comprises first and second separate body sections, wherein said first and second body sections are substantially identical to each other, wherein each of said first and second body sections has a joining end, and wherein each joining end of said first and second body sections comprises an extending tang-like portion and a recess portion whereby when said first and second body sections are joined to each other at their joining ends the tang-like portion of the first body section is received by the recess portion of said second body section and the tang-like portion of the second body section is received by the recess portion of said first body section.

21. A storage rack according to claim 17 wherein said first and second end containment means are carried by said elongated flat member.

22. A storage rack for the storage of recordings and the like, comprising mounting means, said mounting means comprising elongated body means having opposed upper and lower relatively long body side edges and opposed first and second relatively short body end edges, said elongated body means further comprising opposed relatively rearwardly and forwardly situated surface means, wherein said forwardly situated surface means extends for at least most of the distance between said upper and lower relatively long body side edges and extends for at least most of the distance between said first and second relatively short body end edges, relatively upper disposed upper support means carried by said mounting means, wherein said upper means comprises a first U-shaped member of a generally U-shaped configuration having a first elongated bight portion joining spaced first and second legs, said elongated body means comprising a first plurality of passages at least near said first body end edge and a second plurality of passages at least near said second body end edge, wherein said first plurality of passages comprises at least first and second passages, wherein said second plurality of passages comprises at least third and fourth passages, wherein said first leg comprises a first connecting portion selectively receiveable in either of said first and second passages wherein said second leg comprises a second connecting portion selectively receivable in either of said third and fourth passages, wherein with said first and second connecting portions being respectively received by either said first and third passages or said second and fourth passages said first elongated bight portion is situated forwardly of said forwardly situated surface means, relatively lower disposed lower support means carried by said mounting means, wherein said lower support means comprises a second U-shaped member of a generally U-shaped configuration having a second elongated bight portion joining spaced third and fourth legs, wherein said third and fourth legs are connected to said elongated body means as to maintain said second elongated bight portion in a fixed position relative to said elongated body means, wherein when in said fixed position said second elongated bight portion is situated relatively forwardly of said forwardly situated surface means, wherein when said first U-shaped member is connected to said elongated body means having said first and second connecting portions respectively receiving by said first and third passages said first bight portion is situated a first distance forwardly of said forwardly situated surface means, wherein said first U-shaped member is connected to said elongated body means by having said first and second connecting portions respectively received by said second and fourth passages said first bight portion is situated a second distance forwardly of said forwardly situated surfaces means, wherein said first distance is greater than said second distance, wherein both said first and second distances are greater than the distance by which said second bight portion is disposed forwardly of said forwardly situated surface means, wherein said second elongated bight portion is effective for providing generally upward support to such recordings and the like as are placed thereatop, and wherein said first U-shaped member whether connected to said elongated body means as to have said first bight portion situated at either said first or second distance is effective to have said first bight portion serve as an abutment-like retainer generally containing said recordings and the like as are placed atop said second elongated bight portion between said first elongated bight portion and said forwardly situated surface means and maintaining said recordings and the like atop said second elongated bight portion.

23. A storage rack according to claim 22 wherein said first plurality of passages further comprises a fifth passage, wherein said second plurality of passages further comprises a sixth passage, wherein said first and second connecting portions are respectively receivable in said fifth and sixth passages, wherein when said first U-shaped member is connected to said elongated body means by having said first and second connecting portions respectively received by said fifth and sixth passages said first bight portion is situated a third distance forwardly of said forwardly situated surface means, wherein said second distance is greater than said third distance, wherein said third distance is greater than distance by which said second bight portion is disposed forwardly of said forwardly situated surface means, and wherein said first U-shaped member when connected to said elongated body means as to have said first bight portion situated at said third distance is also effective to have said first bight portion serve as an abutment-like retainer generally containing said recordings and the like as are placed atop said second elongated bight portion between said first elongated bight portion and said forwardly situated surface means and maintaining said recordings and the like atop said second elongated bight portion.

24. A storage rack according to claim 22 and further comprising first and second end containment means, said end containment means being carried by said elongated body means and movable toward and away from such recordings and the like as are placed atop said lower support means to thereby enhance the vertical stability of such recordings and the like.

25. A storage rack according to claim 24 and further comprising guide-like retaining means carried by said elongated body means and extending longitudinally thereof, and wherein said first and second end containment means are each connected to said guide-like retaining means for slidable movement relative thereto and longitudinally of said elongated body means.

26. A storage rack according to claim 25 wherein said guide-like retaining means comprises a longitudinally extending slot formed in said elongated body means and a longitudinally extending opening formed through said forwardly situated surface means and communicating with said longitudinally extending slot, and wherein each of said first and second end containment means comprises a slide portion passing through said longitudinally extending opening and slidably received in said longitudinally extending slot.

27. A storage rack according to claim 22 wherein said forwardly situated surface means comprises at least first and second forwardly situated surface portions, wherein each of said first and second forwardly situated surface portions extends longitudinally of said elongated body means, wherein said first forwardly situated surface portion is at a relative elevation generally above the elevation of said second forwardly situated surface portion, and wherein said second forwardly situated surface portion is inclined with respect to said first forwardly situated surface portion as to have the upper part of said second forwardly situated surface portion relatively nearer said rearwardly situated surface means that is said first forwardly situated surface portion.

* * * * *

UNITED STATES PATENT AND TRADEMARK OFFICE
CERTIFICATE OF CORRECTION

PATENT NO. : 4,867,318

DATED : September 19, 1989

INVENTOR(S) : Jerry A. Robson

It is certified that error appears in the above-identified patent and that said Letters Patent is hereby corrected as shown below:

Column 3, line 23, between "is" and "view" insert --- a ---.

Column 20, line 65 (line 43 of Claim 13) change "pivotably" to --- pivotally ---.

Column 21, line 6 (line 52 of Claim 13) change "pivotably" to --- pivotally ---.

Column 22, line 33 (line 14 of Claim 22) insert --- support --- between "upper" and "means".

Column 22, line 45 (line 26 of Claim 22) immediately after "passages" insert a comma.

UNITED STATES PATENT AND TRADEMARK OFFICE
CERTIFICATE OF CORRECTION

PATENT NO. : 4,867,318
DATED : September 19, 1989
INVENTOR(S) : Jerry A. Robson

It is certified that error appears in the above-identified patent and that said Letters Patent is hereby corrected as shown below:

Column 22, line 65 (line 46 of Claim 22) insert --- by --- between "means" and "having".

Column 22, line 66 (line 47 of Claim 22) change "receiving" to --- received ---.

Column 23, line 1 (line 50 of Claim 22) between "wherein" and "said" insert --- when ---.

Column 23, line 36 (line 13 of Claim 23) immediately after "than" insert --- the ---.

Column 24, line 43 (line 14 of Claim 27) change "that" to --- than ---.

Signed and Sealed this

Ninth Day of April, 1991

Attest:

HARRY F. MANBECK, JR.

*Attesting Officer*     *Commissioner of Patents and Trademarks*